United States Patent
Rainbolt et al.

(10) Patent No.: US 10,444,486 B2
(45) Date of Patent: Oct. 15, 2019

(54) SYSTEMS AND METHODS FOR DETECTION OF BLANK FIELDS IN DIGITAL MICROSCOPES

(71) Applicant: Microscopes International, LLC, Plano, TX (US)

(72) Inventors: Richard K. Rainbolt, Allen, TX (US); Jonathan C. Ward, Plano, TX (US)

(73) Assignee: Microscopes International, LLC, Plano, TX (US)

( * ) Notice: Subject to any disclaimer, the term of this patent is extended or adjusted under 35 U.S.C. 154(b) by 0 days.

(21) Appl. No.: 15/694,990

(22) Filed: Sep. 4, 2017

(65) Prior Publication Data

US 2019/0072751 A1    Mar. 7, 2019

(51) Int. Cl.
| | |
|---|---|
| G02B 21/36 | (2006.01) |
| G02B 21/26 | (2006.01) |
| G06T 7/90 | (2017.01) |
| G02B 21/00 | (2006.01) |
| H04N 5/232 | (2006.01) |
| H04N 5/247 | (2006.01) |
| G01Q 20/00 | (2010.01) |

(52) U.S. Cl.
CPC ......... G02B 21/367 (2013.01); G02B 21/002 (2013.01); G02B 21/26 (2013.01); G02B 21/365 (2013.01); G06T 7/90 (2017.01); *G01Q 20/00* (2013.01); *G06T 2207/10016* (2013.01); *G06T 2207/10024* (2013.01); *G06T 2207/10061* (2013.01); *G06T 2207/20072* (2013.01); *H04N 5/232* (2013.01); *H04N 5/247* (2013.01)

(58) Field of Classification Search
CPC .... G02B 21/002; G02B 21/26; G02B 21/362; G02B 21/365; G02B 21/367; G06T 7/90; G01Q 20/00
See application file for complete search history.

(56) References Cited

U.S. PATENT DOCUMENTS

| | | |
|---|---|---|
| 4,066,356 A | 1/1978 | Parker |
| 4,279,173 A | 7/1981 | Krebs et al. |
| 5,025,676 A | 6/1991 | Perretta |
| 5,471,515 A | 11/1995 | Fossum et al. |
| 5,540,112 A | 7/1996 | Baker et al. |
| 5,841,126 A | 11/1998 | Fossum et al. |
| 6,005,619 A | 12/1999 | Fossum |
| 6,101,265 A | 8/2000 | Bacus et al. |
| 6,226,392 B1 | 5/2001 | Bacus et al. |
| 6,272,235 B1 | 8/2001 | Bacus et al. |
| 6,396,941 B1 | 5/2002 | Bacus et al. |

(Continued)

OTHER PUBLICATIONS

Ekanayake, Virantha, "Detecting Color vs. Greyscale and Blank Pages During Scanning," available at https://virantha.com/2014/03/30/images-color-and-blank-detection/, Virantha.com, Mar. 30, 2014.

(Continued)

*Primary Examiner* — Robert J Hance
(74) *Attorney, Agent, or Firm* — Timothy L. Scott

(57) ABSTRACT

Systems and methods for rapidly identifying blank fields while capturing a plurality of color field images using a slide scanning microscope having a movable slide stage, a movable objective lens, and a digital video camera having a color digital image sensor that encodes RGB color data for each pixel in a field image.

28 Claims, 11 Drawing Sheets

(56) References Cited

U.S. PATENT DOCUMENTS

| | | |
|---|---|---|
| 6,466,690 B2 | 10/2002 | Bacus et al. |
| 6,522,774 B1 | 2/2003 | Bacus et al. |
| 6,674,881 B2 | 1/2004 | Bacus et al. |
| 6,674,884 B2 | 1/2004 | Bacus et al. |
| 6,711,283 B1 | 3/2004 | Soenksen |
| 6,775,402 B2 | 8/2004 | Bacus et al. |
| 6,917,696 B2 | 7/2005 | Soenksen |
| 7,031,507 B2 | 4/2006 | Bacus et al. |
| 7,035,478 B2 | 4/2006 | Crandall et al. |
| 7,110,586 B2 | 9/2006 | Bacus et al. |
| 7,116,440 B2 | 10/2006 | Eichhorn et al. |
| 7,149,332 B2 | 12/2006 | Bacus et al. |
| 7,235,047 B2 | 6/2007 | MacAulay et al. |
| 7,257,268 B2 | 8/2007 | Eichhorn et al. |
| 7,428,324 B2 | 9/2008 | Crandall et al. |
| 7,457,446 B2 | 11/2008 | Soenksen |
| 7,706,060 B2 | 4/2010 | Mogami et al. |
| 7,755,832 B2 | 7/2010 | MacAulay et al. |
| 7,813,579 B2 | 10/2010 | Oshiro et al. |
| 7,978,894 B2 | 7/2011 | Soenksen |
| 8,027,548 B2 | 9/2011 | Oshiro et al. |
| 8,055,042 B2 | 11/2011 | Soenksen |
| 8,114,625 B2 | 2/2012 | Bocking et al. |
| 8,184,920 B2 | 5/2012 | Oshiro et al. |
| 8,385,619 B2 | 2/2013 | Soenksen |
| 8,664,002 B2 | 3/2014 | Yeung |
| 8,668,640 B2 | 3/2014 | MacAulay et al. |
| 8,755,579 B2 | 6/2014 | Soenksen |
| 9,386,211 B2* | 7/2016 | Soenksen .......... H04N 5/23206 |
| 10,119,901 B2 | 11/2018 | Casas |
| 2003/0179445 A1 | 9/2003 | Casas |
| 2007/0159687 A1* | 7/2007 | Tohma ................ G02B 21/244 |
| | | 359/368 |
| 2008/0152208 A1* | 6/2008 | Zahniser ............. G02B 21/244 |
| | | 382/133 |
| 2016/0299057 A1 | 10/2016 | Casas |
| 2018/0157023 A1* | 6/2018 | Gunderson ........ G02B 21/0036 |
| 2018/0253590 A1* | 9/2018 | Lloyd .................. G06T 7/0012 |

OTHER PUBLICATIONS

Kayser, K et al., "From Telepathology to Virtual Pathology Institution: the New World of Digital Pathology," Romanian Journal of Morphology and Embryology, vol. 45, Nov. 1998, pp. 3-9.

Rojo, M. et al., "Critical Comparison of 31 Commercially Available Digital Slide Systems in Pathology," International Journal of Surgical Pathology, vol. 14, No. 4, Oct. 2006, pp. 285-305.

"Detecting Blank Image Files," available at https://superuser.com/questions/343385/detecting-blank-image-files, Stack Exchange Network, Oct. 5, 2011, Dec. 3, 2013, Feb. 22, 2015, Apr. 8, 2015, Oct. 9, 2017.

* cited by examiner

SYSTEMS AND METHODS FOR DETECTION OF BLANK FIELDS IN DIGITAL MICROSCOPES

BACKGROUND OF THE INVENTION

This invention relates generally to the field of digital microscopes, and more specifically to slide scanning digital microscope systems and methods for the detection of blank fields while scanning all or a portion of a microscope slide specimen.

Since the development of the first working optical microscopes, magnified images have been used in many areas of scientific research. Lens improvements in the $18^{th}$ and $19^{th}$ centuries greatly improved the performance of conventional compound (i.e., multi-lens) microscopes in producing accurate images. The electron microscope, developed in the $20^{th}$ century, allowed scientists to obtain images of structures far smaller than those observable with optical microscopes. However, the use of optical microscopes to observe specimens mounted on glass slides remains important in many fields, such as botany, microbiology, geology, and medicine.

The utility of conventional compound optical microscopes for examining slide-mounted specimens is compromised because the field of view (FOV)—the portion of the specimen visible to the user through the objective lens at the eyepiece at any given time—becomes smaller as magnification increases. There is an inverse relationship between the optical magnification used to view the specimen and how much of the overall slide may be seen in the FOV.

The limited FOV of conventional compound microscopes becomes problematic when a user views a specimen under low magnification to identify a target area (also referred to as a region of interest or ROI) for viewing at high magnification. Once the target area is identified, the user must switch objective lenses to a higher magnification and reacquire the target area at the higher magnification. However, because the FOV at the higher magnification is smaller, the target area—which may have been completely visible in the FOV at the lower magnification—may not be visible in its entirety at the higher magnification. In addition, because there is no cross-reference to identify the location of the FOV at the new (higher) magnification within the overall slide specimen or within the FOV at the lower magnification, the user may have difficulty locating or be unsure where the target area is located after switching objective lenses. Additionally, the user may miss important portions of the target, or may be unsure whether the image acquired at the higher magnification is actually part of the target area identified at the lower magnification. Essentially, the user's location within the "forest" of the overall slide becomes lost when focusing on the "trees" of a specific location at higher magnification.

If the user is a pathologist scanning for cancerous cells in a tissue sample of a patient, for example, this could result in a missed diagnosis and obvious risk to patient health. In different contexts, the user may miss other desired structures, such as a particular cell wall region in a botanical sample, a particular group of microbial cells, specific crystal structures in a geological sample, or an area of high white blood cell counts in a blood sample.

In the last twenty-five years, the use of automated microscopes to generate digital images for examining microscope slides has become increasingly common. A class of microscopes using a combination of optical and electronic image acquisition and processing techniques, known as whole slide imaging (WSI) microscopes, has seen extensive growth.

WSI microscopes are automated microscopes that use a camera with a digital image sensor (DIS) to capture magnified images that may be viewed on a computer monitor or screen. An objective lens optically coupled to the camera provides magnification of the specimen on the microscope slide. Objective lenses at various magnifications (e.g., 20×, 40×, 60×, or 80×) may be used to provide a desired magnification. A movable stage holding the microscope slide allows the specimen to be moved in a pattern of rows and/or columns, and images may be captured of all or part of the slide. WSI microscopes also include an illuminator having a light source to illuminate the slide specimen, and illuminator optics to direct the light through the specimen and into the objective lens. A computer, which may be coupled to the WSI microscope or included as part of a WSI microscope system, is used to control the acquisition of digital images.

Because WSI microscope images are intended to be displayed on a computer or television screen or monitor, WSI microscopes typically lack the ocular or eyepiece lens in a standard compound microscope. Thus, magnification of the slide specimen is usually provided by a single objective lens (which may include a relay lens for infinity-focused objectives) in optical communication with the DIS. Stated differently, the optical path of a WSI microscope typically replaces the ocular lens with a digital image sensor (DIS).

WSI microscopes allow a user to deal with the FOV problem of conventional microscopes by providing computer-enabled features not present in standard compound ocular microscopes. These include a digital cross-reference of the "instantaneous" FOV of the objective lens at any time. Using this feature, the user can always see (e.g., by digital cross-hairs or other highlighting) where the instantaneous objective lens FOV is located within the overall slide specimen. More importantly, WSI microscopes allow the user to view a relatively large target area or region of interest (ROI) at high magnification in its entirety. And like the instantaneous view of the objective lens, the ROI is also cross-referenced to show the user at a glance its location within the overall slide specimen.

WSI microscopes typically provide an overview image of the entire specimen area of the slide at low (or zero) magnification in an overview image window on a computer screen. The overview image may be taken by an overview camera at low or zero optical magnification and displayed as a thumbnail image in the overview window. The digital cross-reference of the instantaneous objective lens FOV to the overview image is obtained by calibration during the manufacturing process. Typically, a calibration slide having a grid and/or other features (e.g., circles) of known dimensions provides a coordinate system that may be displayed on the computer screen. The objective lens is then centered on several key positions on the calibration slide, and the computer is used to store the locations (i.e., the X, Y coordinates of the side stage) of those positions within a memory (which may be in the WSI microscope or an attached computer). By storing the location of a number of different positions on the calibration slide, the WSI can always determine the location of where the objective lens is currently positioned on the slide. Equally importantly, the computer can reposition the objective lens to any given point designated by the user on the overview image, i.e., the user can cause the objective lens to "jump" to a new location on the slide by designating its position (e.g., with a mouse or touchscreen) on the overview image. The jump (new instantaneous) position may then be identified in the overview image by digital crosshairs, highlighting, etc.

In some microscopes, the overview image may be digitally enlarged by adding additional pixels to create a larger image. The additional pixels, however, add no additional image detail. Thus, the image appears large on the screen, but the image resolution remains the same. The digitally enlarged (low quality) overview image may assist the user in designating the one or more target or ROI areas for higher magnification and resolution.

While useful, however, knowing the "instantaneous" position of the objective lens FOV within the overview image is less important than being able view a relatively large target area or region of interest (ROI) in its entirety (i.e., as a single image which may be scrolled through on a computer screen or monitor). WSI microscopes allow a user to obtain a single image of a target area that is much larger (tens, hundreds, or thousands of times the area of a single objective lens FOV) for review within a window of a computer screen. This mode of operation, sometimes referred to as "scan" or "zoom" mode), allows the user to work with an image that is much smaller than the entire slide, and helps to ensure specific areas for review at higher magnification are not missed because of the FOV problem. In addition, the target area/ROI can also be cross-referenced and indicated (e.g., as a highlighted box or other area) on the overview image.

To generate an ROI image at high magnification, the user first designates on the overview image, using, e.g., a mouse or touchscreen, a target area of the specimen. After the ROI is designated and highlighted, the user may then cause the WSI microscope to scan the ROI and create a series of smaller, overlapping digital images of adjacent Fields of View (each of which is usually referred to as a "field image" or "tile") that completely cover the target area (ROI). The overlapping field images are acquired by the digital camera as the movable stage moves the target area across the objective lens. Software then uses the overlapping edge areas of adjacent field images scanned by the digital camera to digitally combine the individual FOV images into a single high-magnification image of the ROI.

The single, high magnification ROI image may be viewed in its entirety within a window of a computer screen (e.g., by scrolling or standard computer window manipulations). The calibration process described above also allows the high magnification ROI image to be highlighted on the overview image (e.g., as a colored or darkened box, etc.). A variety of software algorithms may be used to combine the field images. The resulting composite, magnified ROI image is similar to a panoramic image assembled by software from a series of overlapping images on non-microscopic digital cameras.

Software may also be used to create an artificial "zoom in/zoom out" ability when viewing the complete ROI image. A series of images at various lesser magnifications of the single, fully magnified ROI image are created by image processing algorithms to digitally reduce the detail level in the fully magnified ROI. Although the level of detail may be reduced, it enables the user to "zoom out" to see a larger portion of the entire slide, up to and including the entire specimen area. These intermediate magnifications may be accessed by the user, e.g., using a mouse wheel or keystrokes, when viewing the complete ROI image comprising multiple field images.

In one mode of operation ("browse mode" or "live view mode"), the user may view or browse any area of the specimen through the instantaneous objective lens FOV (e.g., at 20×, 40×, 60×, etc.). In browse mode, a window is used to display the "live" field of view currently received by the digital image sensor from the objective lens. The overview image may be displayed in a corner of the browse window or in a smaller thumbnail window. The overview image includes highlighting (e.g., cross-hairs, a highlighted dot or box) to visually designate where the current FOV image of the objective lens (i.e., the image in the browse window) is located within the overview image.

The browse/live view mode thus maps the current FOV of the objective lens back to the overview image of the specimen. In doing so, the user is provided with a visual indication of which "trees" (browse window image) within the slide "forest" (the overview) are being viewed at high magnification in browse mode at any given time. In WSI microscopes at higher magnifications (e.g., 40× or 60×), the FOV of the objective lens may be so small that visualizing it within the overview image is enhanced by digitally enlarging the overview image in the overview image window, so that the objective lens FOV can be seen as a box or area on the overview image rather than a single point.

In some WSI microscopes, separate windows may be used for each of the overview, browse, and zoom/ROI images, while in other systems the overview image may be includes as part of the larger screen image in either browse mode operation or zoom mode operation. In general, the user may toggle between the overview and/or browse or zoom images (i.e., between a low-magnification and a high-magnification image. Typically, the relative sizes of the overview (low-magnification) and high-magnification images (i.e., the browse/"live FOV" image or a zoom/target area/ROI image).

WSI microscopes having the foregoing functions and features are described in, e.g., U.S. Pat. Nos. 6,101,265 and 6,711,283, each of which is hereby incorporated by reference in its entirety. Compact WSI microscopes having similar features to those described are available from Microscopes International, LLC (Plano, Tex.) with a 20×, 40× or 60× magnification. Models include the uScope MXII, the uScope HXII, the uScope DXII, and the uScope GXII.

Although there are significant variations among commercially available systems, a WSI microscope typically includes a movable stage that holds the microscope slide. In some systems, the stage is motorized to move at a constant speed, and digital field images are taken while the stage is moving, at time intervals synchronized to the stage speed to obtain field images for combination into the high-resolution ROI image. These WSI systems are referred to herein as moving image acquisition (MIA) systems. Conversely, in other systems the stage is motorized to move rapidly to a series of fixed or stationary positions from which the field images of the ROI are captured and subsequently combined. These WSI systems are referred to herein as fixed image acquisition (FIA) systems, because the image is obtained with the stage in a fixed (i.e., stationary) position. In both MIA and FIA systems, one or more motors are typically provided to move the stage in and out (X axis) and left and right (Y axis).

WSI microscopes also include an illumination system providing light to the slide stage, and an objective lens to magnify the light from the slide specimen and focus it on a digital image sensor (DIS) element in a digital camera. Focusing is typically provided by making one or more of the stage and the camera/objective lens structure (the camera and objective lens in WSI microscopes are typically coupled to a tube to maintain a fixed distance therebetween) movable by a motor (Z axis) capable of finely controlled, small movements on an axis generally perpendicular to the slide stage. This allows structures at different depths within the specimen to be captured in proper focus.

Digital image sensor cameras for WSI microscopes typically involve a CCD (charge coupled device) or a CMOS (complementary metal oxide semiconductor) image sensor as the DIS element. In some WSI systems, the DIS is incorporated into a static (snapshot) camera that captures field/tile images and combines them into a single, high-definition ROI image. In other systems, the DIS is incorporated into a video camera that outputs a stream of video images, from which frames may be captured as still image fields/tiles. Recent trends in digital photography, particularly digital video cameras, have seen a migration toward CMOS digital image sensors, which are most cost-effective than CCD sensors.

For video cameras, each distinct image output by the DIS element is known as a frame. Output rates for such video cameras are measured in frames per second (FPS), with typical rates between 10 and 90 FPS. Thus, at a frame rate of 30 FPS (typical for many video cameras), each new image in the video stream is created every 33.33 milliseconds (mSec), which is referred to as the frame time (FT). Similarly, at 50 FPS, the images are captured every 20 mSec. For FIA systems, the images are obtained while the stage is not moving, so any video frame captured while the stage is stationary may be used as the field image or tile.

Once all the field images comprising a ROI have been captured, image combination algorithms are used to combine the field images into a single, high-definition ROI image. Although a variety of image combination algorithms are used, one class of algorithms known as pattern matching algorithms operates by mathematically aligning the edges of adjacent field images until they overlap, and then combining the images at the overlapping region.

A significant limitation associated with WSI microscopes is the time required to take and compile the field images or tiles for combination into the single high definition ROI image. To obtain a ROI or target area image using either a MIA or FIA system, the WSI microscope objective is moved over the ROI, and magnified images are taken of very small areas either while the stage is moving (MIA systems) or stationary (FIA systems). The X-axis and Y-axis (stage movement) and Z-axis (focus) motors in the WSI microscope must be synchronized with the camera to properly capture digital field images.

In FIA systems, each X-axis and Y-axis movement to a new stationary field position takes a certain time (move time or MT) to occur, and causes a system vibration that requires a certain damping time (Settle Time or ST) to elapse before a usable field image may be taken (i.e., a field image without blurring). Settle times are imposed as a delay period after the slide stage is moved to a new field position. The ST delay period enables the vibrations associated with the movement (and the stopping of the movement) to dampen out, and thereby ensures that a field image captured by the SSM camera is a stable image without blurring. Imposing a post-movement Settle Time ensures that the field image is suitable for use as a field or tile in a combined ROI or target area image. Z-axis movements of the objective lens to obtain images at different focuses also require a move time, and a Z-axis (focus movement) ST may also be required before a usable image may be captured. Thus, Frame Times are limited not only by the move time in moving the camera from a first image position to a second image position, but also by the settle time necessary to resolve the vibrations following the move and enable a usable image to be captured.

Furthermore, after the settle time, any partially completed video frame output from the camera must be completed before the next video frame can be captured (frame completion time or FCT).

For some field images, called exhaustive focus fields (EFF), multiple images at the same slide stage position (i.e., X-axis and Y-axis location) in FIA systems are taken at different focus points (Z-axis positions). This involves a Z-axis focusing movement of either the slide stage or the light path/tube containing the DIS and the objective lens. In some cases, an additional settle time (ST) may be necessary for the camera vibration associated with the Z-axis movement to dampen out. In such cases, and additional FCT period may be added to complete the video frame output occurring when the Z-axis settle time elapses.

In many instances, a specimen may have an irregular shape, and much of a target area may be blank (i.e., the field image may contain none of the microscope specimen). This is particularly significant when a relatively large target area/ROI having an irregular or filamentary structure, or which includes void areas within a larger image. If these areas could be rapidly identified, operation of the WSI microscope could be significantly speeded up. Blank fields are particularly time-consuming for exhaustive focus fields, because the WSI microscope captures numerous wasted field images as part of a Z-stack (i.e., a group of differently-focused images at a single location) in a futile attempt to obtain an image with an improved focus score. However, since there is usually little data in the field image other than variations associated with dust, dirt, debris, and slight variations in lighting across the field image, the control unit may cause the objective lens to move through a wide range of focus positions (Z-axis movements) in an attempt to obtain a "best image" for a field that actually has no specimen content.

The process of capturing the multiple field images in a Fixed Image Acquisition (FIA) system for compilation into the ROI image includes the following steps:

1. move the slide stage to a desired (X, Y) location relative to the objective lens (slide stage MT);
2. wait for the vibration from the stage motion to dampen out (slide stage ST);
3. wait for the current partially completed video frame to finish (FCT);
4. capture the next complete video frame output from the camera (FT);
5. calculate a focus score for the captured field image;
6. change the focus position (Z axis location) of the objective lens at the same X, Y location (optional step for multiple images at the same field position to obtain the best focus; Z-axis MT);
7. wait for the focus (Z-axis) movement to dampen out (optional step for multiple images at the same field position to obtain the best focus; Z-axis ST);
8. wait for the current partially completed frame to finish (optional step for multiple images at the same field position to obtain the best focus; FCT);
9. capture the next complete image output from the camera (optional step for multiple images at the same field position to obtain the best focus; FT);
10. calculate a focus score for the captured field image
11. repeat steps 6-10 for multiple images until all images at the same field position are obtained; the multiple images at the same location are referred to as a Z stack, and the image from the Z-stack having the most appropriate focus score is retained as the (single) image for the field position;

12. repeat steps 1-5 (for single-focus images) or 1-11 (for exhaustive focus fields) until field images for all desired the ROI have been scanned.

Additional detail about existing WSI systems is provided in co-pending U.S. patent application Ser. No. 15/616,922, filed Jun. 8, 2017, entitled "Systems and Methods for Rapid Scanning of Images in Digital Microscopes," which is hereby incorporated by reference in its entirety.

Ideally, all movements (X-axis, Y-axis, and Z-axis) would occur instantaneously, and with no settle time. This would allow each field image captured from the camera's video stream to have a valid, usable image. At 50 FPS, the camera would produce 50 field images each second. In addition, all blank fields would preferably be identified either in advance of the scanning process and not scanned at all, or identified rapidly during scanning so that the slide stage may rapidly be moved to another position.

In Fixed Image Acquisition (FIA) systems, the settle time for the stage (or objective lens) movement substantially slows the field image acquisition process for preparing a ROI image. Moreover, for irregularly shaped specimens with a relatively high number of blank fields, the process of scanning the blank fields imposes an additional time burden for acquiring field images. There is a need for improved systems with faster field image acquisition for combining into an ROI image.

SUMMARY

In one embodiment, the present invention relates to a method of identifying blank fields while capturing a plurality of color field images using a slide scanning microscope, each field image comprising an image of a portion of a target area of a microscope slide specimen area, the plurality of field images covering the target area, the slide scanning microscope having a moveable slide stage for holding a microscope slide, a movable objective lens, a digital video camera having a color digital image sensor that encodes RGB color data for each pixel in a field image, and a control unit for controlling the operation of the movable slide stage, the movable objective lens, and the digital video camera in capturing field images, the method comprising: a) performing a slide stage movement to move the slide stage to a desired stationary field position, the slide stage movement having a slide stage settle time following the slide stage movement, during which vibration of the slide stage microscope precludes capturing a usable image of a non-blank field; b) capturing a first color field image at the desired stationary field position using the digital video camera; c) determining a grayscale pixel value for each pixel in the first color field image based on the RGB color data for the first color field image; d) determining a first extreme grayscale pixel value as the first grayscale pixel value exceeding a first extreme grayscale threshold number of pixels; e) determining a second extreme grayscale pixel value as the last grayscale pixel color exceeding a second extreme grayscale threshold number of pixels; f) determining a first grayscale pixel range distance between the first extreme grayscale pixel value and the second extreme grayscale pixel value; and g) initiating a repeat of step a) prior to the lapse of the slide stage settle time if the first grayscale pixel range distance is less than a non-blank grayscale pixel range threshold distance.

In one embodiment, the present invention relates to a method of identifying blank fields while capturing a plurality of color field images using a slide scanning microscope, each field image comprising an image of a portion of a target area of a microscope slide specimen area, the plurality of field images covering the target area, the slide scanning microscope having a moveable slide stage for holding a microscope slide, a movable objective lens, a digital video camera having a color digital image sensor that encodes RGB color data for each pixel in a field image, and a control unit for controlling the operation of the movable slide stage, the movable objective lens, and the digital video camera in capturing field images, the method comprising: a) performing a slide stage movement to move the slide stage to a desired stationary field position, the slide stage movement having a slide stage settle time following the slide stage movement, during which vibration of the slide stage microscope precludes capturing a usable image of a non-blank field; b) capturing a first color field image at the desired stationary field position using the digital video camera; c) determining a grayscale pixel value for each pixel in the first color field image based on the RGB color data for the first color field image; d) performing a grayscale pixel value distribution analysis of the first color field image, based on the grayscale pixel values determined for the pixels in the first color field image; e) determining whether the first color field image is a blank field based on the grayscale pixel value distribution analysis; and f) initiating a repeat of step a) prior to the lapse of the slide stage settle time, in response to a determination that the first field image is a blank field.

In one embodiment, the present invention relates to a method of identifying blank field images in the capture of a plurality of color field images using a slide scanning microscope, each field image comprising an image of a portion of a target area of a microscope slide specimen area, the slide scanning microscope having a moveable slide stage for holding a microscope slide, at least one objective lens, a digital video camera having a color digital image sensor that encodes RGB color data for each pixel in a field image, and a control unit for controlling the operation of the movable slide stage, the at least one objective lens, and the digital video camera in capturing field images, the method comprising: a) performing a slide stage movement to move the slide stage to a desired stationary field position, the slide stage movement having a slide stage settle time following the slide stage movement, during which vibration of the slide stage microscope precludes capturing a usable image of a non-blank field using the digital video camera; b) capturing a first field image at the desired stationary slide stage position using the digital video camera; c) performing a grayscale pixel value distribution analysis of the first field image comprising: 1) determining a grayscale pixel value for each pixel in the first color field image based on the RGB color data for the first color field image; 2) determining a first extreme grayscale pixel value as the first grayscale pixel value exceeding a first extreme grayscale threshold; 3) determining a second extreme grayscale pixel value as the last grayscale pixel value exceeding a second extreme grayscale threshold; 4) determining a first grayscale pixel range distance as the distance between the first extreme grayscale pixel value and the second extreme grayscale pixel value; and 5) comparing the first grayscale pixel range distance to a non-blank grayscale pixel range threshold distance; and d) initiating a repeat of step a) prior to the lapse of the slide stage settle time if the first grayscale pixel range distance is less than the non-blank grayscale pixel range threshold distance.

In one embodiment, the present invention relates to a slide scanning microscope system for identifying blank fields during the capture of a plurality of color field images using a slide scanning microscope, wherein each color field image is captured from one of a plurality of stationary slide stage positions using a digital video camera and comprises an image of a portion of a target area of a microscope slide specimen, the slide scanning microscope system comprising: a) a slide scanning microscope comprising: 1) a movable slide stage for holding a microscope slide having a specimen thereon; 2) at least one slide stage motor capable of performing a slide stage movement to move the movable slide stage to a desired stationary slide stage position, the slide stage movement producing post-movement vibrations of the slide scanning microscope and having a slide stage settle time during which the vibrations preclude capturing a usable image of a non-blank field using the digital video camera; 3) at least one objective lens for magnifying light received from the specimen; 4) at least one digital video camera, wherein each of the at least one digital video cameras is optically coupled to one of the at least one objective lenses, each of the at least one digital video cameras having a digital image sensor that encodes RGB color data for the pixels in a field image; and 5) a microscope control unit comprising: A) a computer interface for transmitting data and commands between a computer system and the slide scanning microscope; and B) a CPU having a clock for timing a slide stage settle time following a slide stage movement to a desired stationary field position; and b) a computer system coupled to the slide scanning microscope, capable of receiving from the digital video camera via the computer interface the RGB color data for the pixels in a first color field image captured at a first stationary field position, the computer system comprising: 1) a blank field analysis unit comprising: A) a grayscale pixel value module for determining a grayscale pixel value for each pixel in the first color field image based on the RGB color data for the first color field image; B) an extreme grayscale pixel value module for determining, based on the output of the grayscale pixel value module, a first extreme grayscale pixel value as the first grayscale pixel value exceeding a first extreme grayscale threshold number of pixels, and a second extreme grayscale pixel value as the last grayscale pixel value exceeding a second extreme grayscale threshold number of pixels; C) a grayscale pixel range module for determining, based on the output of the extreme grayscale pixel value module, a first grayscale pixel range distance between the first extreme grayscale pixel value and the second extreme grayscale pixel value; D) a comparison module for comparing the first grayscale pixel range distance to a non-blank grayscale pixel range threshold distance; and E) a blank field signal module for initiating a slide stage movement to a second stationary field position prior to the lapse of the slide stage settle time for the slide stage movement to the first stationary field position, if the comparison module determines that the first grayscale pixel range distance is less than a non-blank grayscale pixel range threshold distance; and 2) a monitor for displaying at least a portion of said plurality of color field images.

DESCRIPTION

Figure 1:
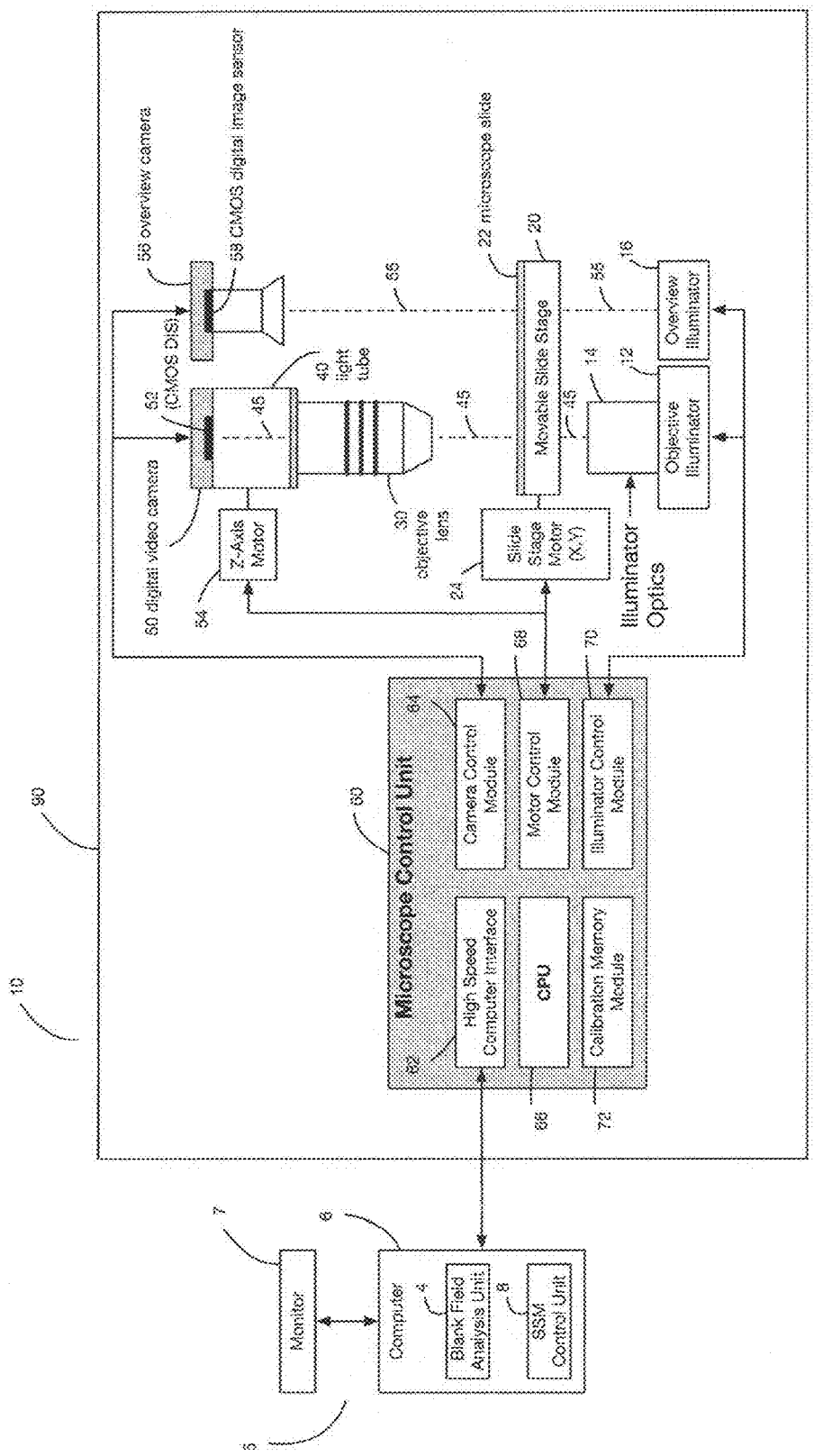
FIG. 1 is a block diagram of one embodiment of a slide scanning microscope system according to the present invention.

Exemplary embodiments of the present disclosure are illustrated in the drawings, which are illustrative rather than restrictive. No limitation on the scope of the technology or on the claims that follow is to be implied or inferred from the examples shown in the drawings and discussed here.

Embodiments of the invention involve fixed image acquisition (FIA) slide scanning microscopes (SSMs) in which a motorized slide stage is rapidly moved to a series of stationary positions from which field images are captured and subsequently combined into a single image of a target area or ROI.

Some embodiments of such microscopes disclosed herein may be used in conjunction with a personal computer (e.g., a PC or Apple computer having a monitor or display/television screen) coupled to the SSM. Thus, certain embodiments of the invention may include an external computer system having a monitor or display screen as part of a SSM system.

In other embodiments, the SSM itself may include a processor or single-board computer (SBC), and certain embodiments of the invention may provide an SSM system that does not require an external computer system. In one embodiment, the SSM may include a processor or SBC allowing the SSM to be directly coupled to a display monitor or screen, and to a user input/output device included as part of the SSM system, without the need for an external computer.

FIG. 1 is a block diagram of a slide scanning microscope (SSM) 10 according to one embodiment of the present invention. The SSM 10 is intended to be coupled to a computer system 5 that includes a computer 6 and a monitor or display screen 7 for displaying images generated by the SSM. Computer 6 further includes a SSM control unit 8 and a blank field analysis unit 6, discussed in greater detail in connection with FIGS. 3-10. A variety of computer systems 5 are suitable for use with the slide scanning microscope 10, but are not discussed fully herein for ease of discussion. The computer system 5 may be coupled to the SSM 10 by a high-speed computer interface 62 (e.g., USB 2.0 or higher, ethernet, or Thunderbolt) within a microscope control unit 60 to be discussed more fully below.

In some aspects of the invention, a slide scanning microscope system may include an SSM 10 as well as a computer system 5. In another aspect, the SSM 10 may include a processor or SBC 88 that is capable of receiving user commands from a user input/output device 9 and controlling a display screen or monitor 7, as more fully explained in FIG. 2.

In the embodiment of FIG. 1, the SSM 10 includes two cameras: an overview camera 56 for an overview light path 55 to capture an overview image of the slide specimen, and a digital video camera 50 coupled to an objective lens 30 in an objective light path 45 to capture magnified images of portions of the slide specimen. Overview camera 56 is used to obtain a complete image of a specimen (not shown) on a microscope slide 22 at either a low or zero magnification (e.g., 4× or less). In various embodiments, overview camera 56 may be a still image (snapshot) camera or a video camera used to capture single images of the specimen on the microscope slide 22. In the embodiment of FIG. 1, the overview camera 56 is a video camera, and includes a CMOS digital image sensor (DIS) 58. In one alternative embodiment, the overview camera may use a CCD image sensor. Because of the digital cross-reference between the overview and objective images, the user can see at a glance (e.g., during browse mode operation) where the objective lens's current FOV is located within the overview image. In scan or zoom mode, the overview image indicates (e.g., by highlighted boxes) where the user has designated one or more target (ROI) areas.

An overview illuminator 16 provides a light source (e.g., an LED) to enable the CMOS digital image sensor 58 of overview camera 56 to capture an overview image of the entire specimen. Light from the illuminator 16 follows light path 55 through a movable slide stage 20 and microscope slide 22 to the CMOS DIS 58.

An objective illuminator 12 provides a light source for viewing the specimen on the microscope slide 22. Illuminator optics 14 may comprise a condenser, a diaphragm and one or more filters for focusing the light from the objective illuminator 12 on the specimen. Light from the objective illuminator 12 follows light path 45 through the illuminator optics 14, movable stage 20 and microscope slide 22, an objective lens 30, and a light tube 40 to a CMOS DIS 52 that is part of a digital video camera 50.

Movable slide stage 20 comprises a generally planar platform that is movable in X and Y directions in the plane of the platform. The movable slide stage 20 includes retainers (not shown), e.g., springs or clips, for securely holding a microscope slide 22 in position on the slide stage 20. In some embodiments, the movable slide stage 20 may include a recessed area for receiving the microscope slide 22 and to assist in maintaining it in position.

One or more slide stage motors 24 is coupled to the movable slide stage 20 and is capable of moving the slide stage 20 and slide 22 rapidly in small increments or steps to a series of stationary positions from which field images of a specimen on the slide 22 may be taken by the digital video camera 50. In one embodiment, two separate motors 24 are provided for X-axis and Y-axis movements of the movable slide stage 20. In another embodiment, a single motor 24 is provided for both X-axis and Y-axis movements. As previously noted, the X-axis and Y-axis movements are each associated with a Move Time (X-axis move time and Y-axis move times, which may be different) and a Settle Time beginning at the conclusion of the Move Time (X-axis settle time and Y-axis settle time, which likewise may be different). To minimize the MT and ST, the movable slide stage 20 may be fabricated from lightweight materials (e.g., lightweight metals or polymers).

Field images may have a dimension of approximately 460 microns×258 microns for a 20× microscope in one embodiment. The slide stage motors 24 are capable of moving the slide with a resolution much smaller than the size of a field image. For example, a step size of 1.25 microns may be used in one embodiment, while a step size of 0.4 microns may be used for another embodiment, although it will be understood that any step size above 0.1 microns can be employed. It will be appreciated that for most field images, the slide stage motor 24 will be commanded to perform X-axis or Y-axis movements on the order of several hundred steps in length to move the stage from a first position, at which a first field image is obtained, to a second position at which a second field image is obtained that slightly overlaps the first field image.

In some embodiments, the step size for the incremental movement of the movable slide stage 20 by the slide stage motor 24 may be programmable, e.g., in increments of 0.1 microns, to a suitable step size to enable field images of the appropriate size for combination to form a complete image of the target area or ROI. As may be appreciated, the resolution available in moving the slide stage 20 is significantly more precise than necessary for ensuring that field images are obtained with an adequate overlap to enable combination into a single target/ROI image. Generally, movements of the movable slide stage 20 are controlled by one or more modules within the microscope control unit 60, explained in greater detail below.

Referring again to FIG. 1, the slide scanning microscope 10 includes an objective lens 30 having a desired magnification, such as 4×, 10×, 20×, 40×, 60×, 100×, etc. Objective lens 30 magnifies the light passing along light path 45 through the microscope slide 22. A variety of commercially available objective lenses 30 may be employed, depending upon the requirements of the intended use. In one embodiment, objective lenses 30 having a numerical aperture in the range of about 0.1 to about 1.25, may be used. Suitable lenses may be finite or infinity-focused, and may provide a variety of optical corrections for, e.g., chromatic and spherical aberrations, etc.

Figure 7:
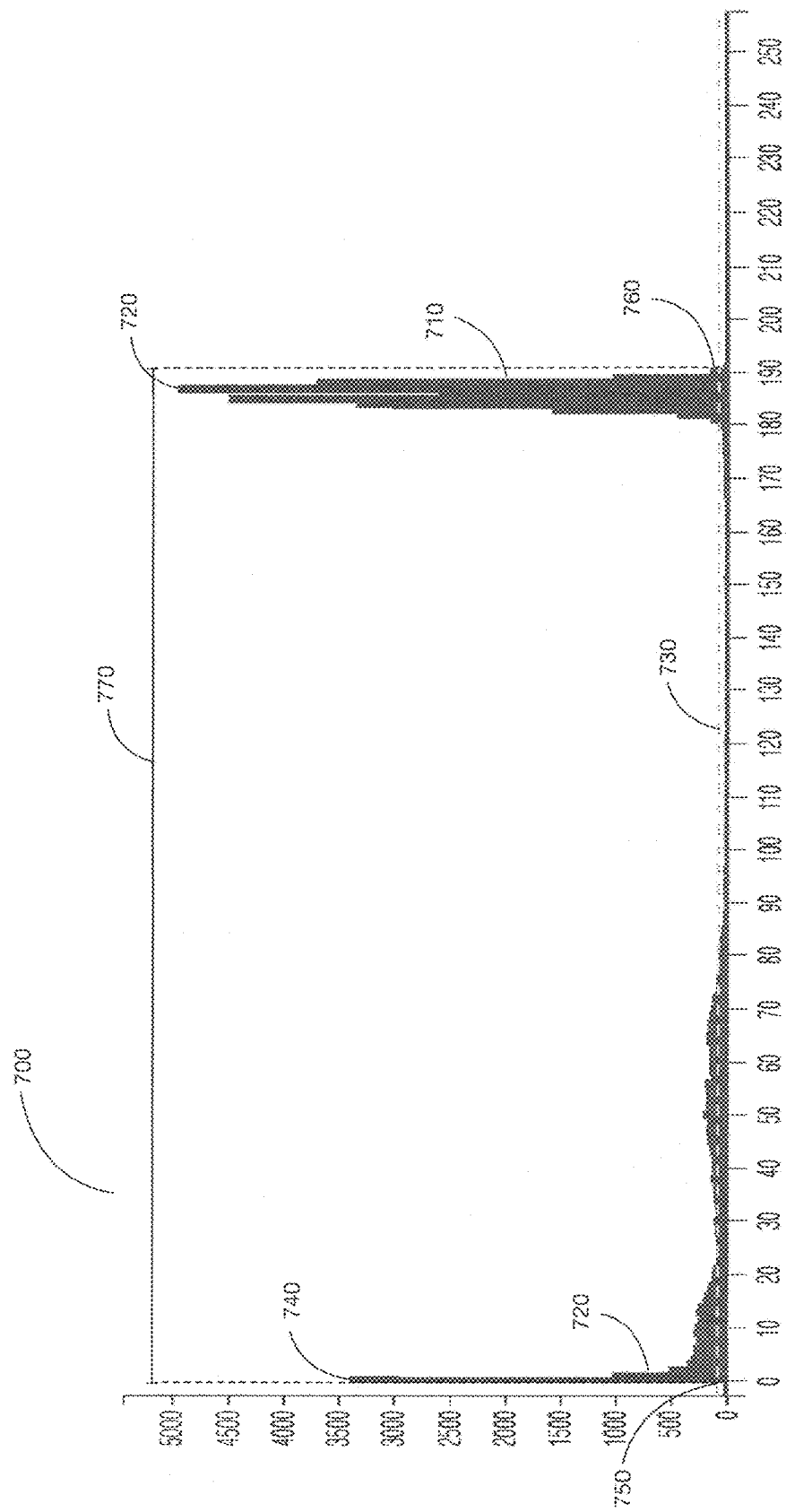
FIG. 7 is a stylized brightness histogram illustrating the pixel distribution of a non-blank field image of a portion of a target area of a microscope slide specimen, using a standard 0-255 grayscale pixel value line.
Figure 8:
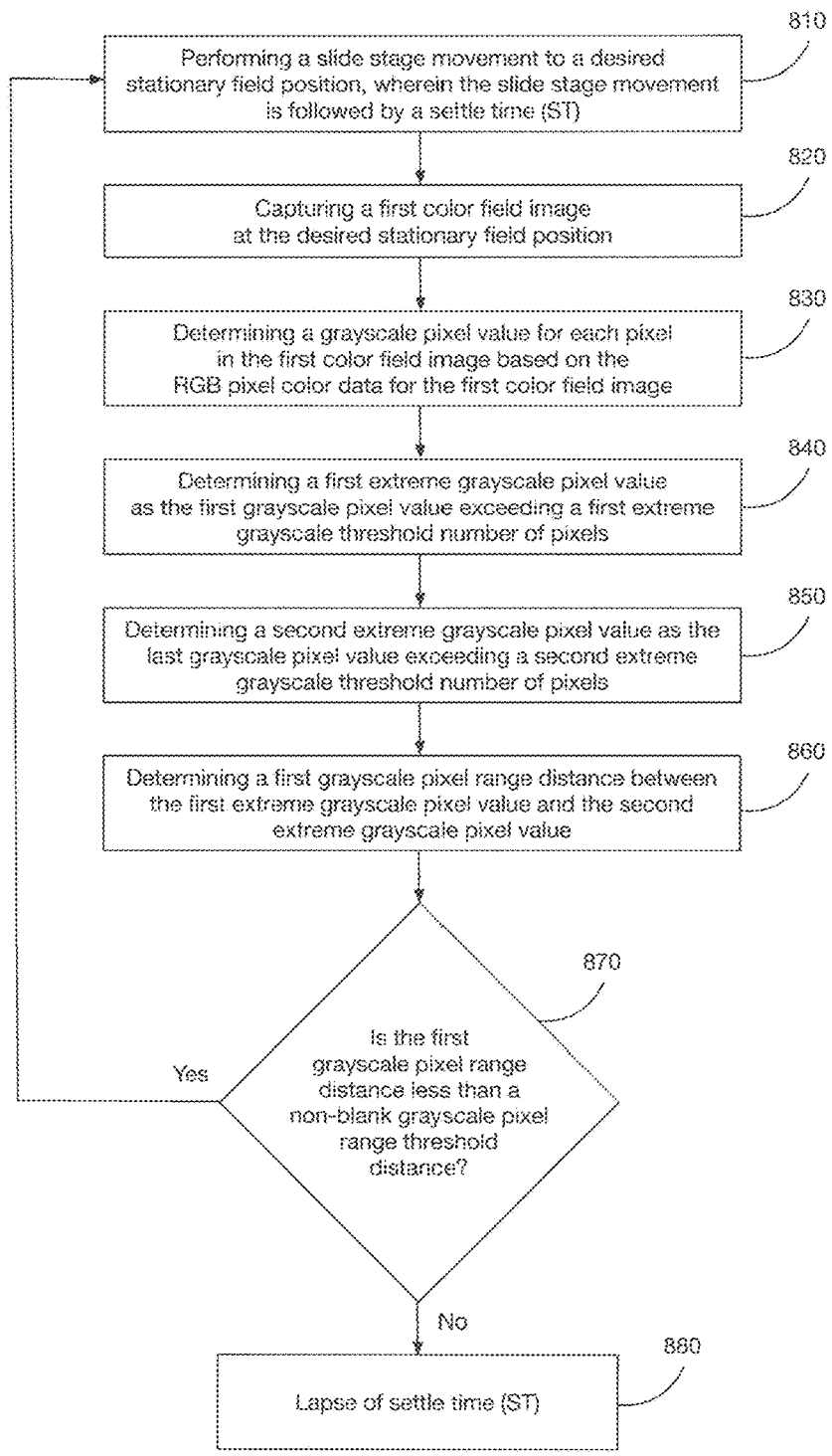
FIG. 8 is a flow chart of a method for rapidly identifying blank fields while capturing a plurality of field images of a microscope slide specimen area using a slide scanning microscope.

In some embodiments of the SSM 10, a light tube 40 may be provided coupling the objective lens 30 to a digital video camera 50. The light tube provides a fixed length between the objective lens 30 and the digital video camera 50. In alternative embodiments, e.g., as shown in FIGS. 7 and 8, light tube 40 may be omitted.

A CMOS digital image sensor 52 in digital video camera 50 receives light along light path 45 from the objective lens 30. Light path 45 passes through light tube 40 to minimize extraneous sources of light that may distort the image generated by digital video camera 50. In alternative embodiments (not shown) the DIS may be a charge coupled device (CCD). In a further alternative embodiment (not shown) the digital video camera 50 may comprise a still (i.e., non-video) camera. The digital video camera 50 preferably operates at a high data rate (e.g., 30 MHz or higher). In one embodiment, the data rate of the digital video camera 50 may be programmable to a desired data rate less than a maximum data rate at which the digital video camera 50 is capable of operating. For example, a digital video camera 50 capable of operating at 48 MHz (i.e., transmitting data at 48 Mbytes/second) may be programmed to operate at 42 MHz to work optimally with a particular image processing system, computer system, and/or computer monitor.

The focus point of the specimen's image on the CMOS DIS 52 may be adjusted by a Z-axis motor 54, which moves the combined structure of the objective lens 30, light tube 40, and digital video camera 50 (including the CMOS DIS 52) in an axis generally perpendicular to the microscope slide 22 and movable slide stage 20. As previously noted, the Z-axis motor is used for exhaustive focus fields (EFF) to obtain a plurality of field images at different focus depths of the same slide area (i.e. microscope stage position). Small Z-axis movements between each field image are used to obtain the plurality of EFF images having different focus depths, which is commonly referred to as a Z-stack. Z-axis movements are associated with a Z-axis move time and, in some embodiments, a Z-axis settle time.

Figure 2:
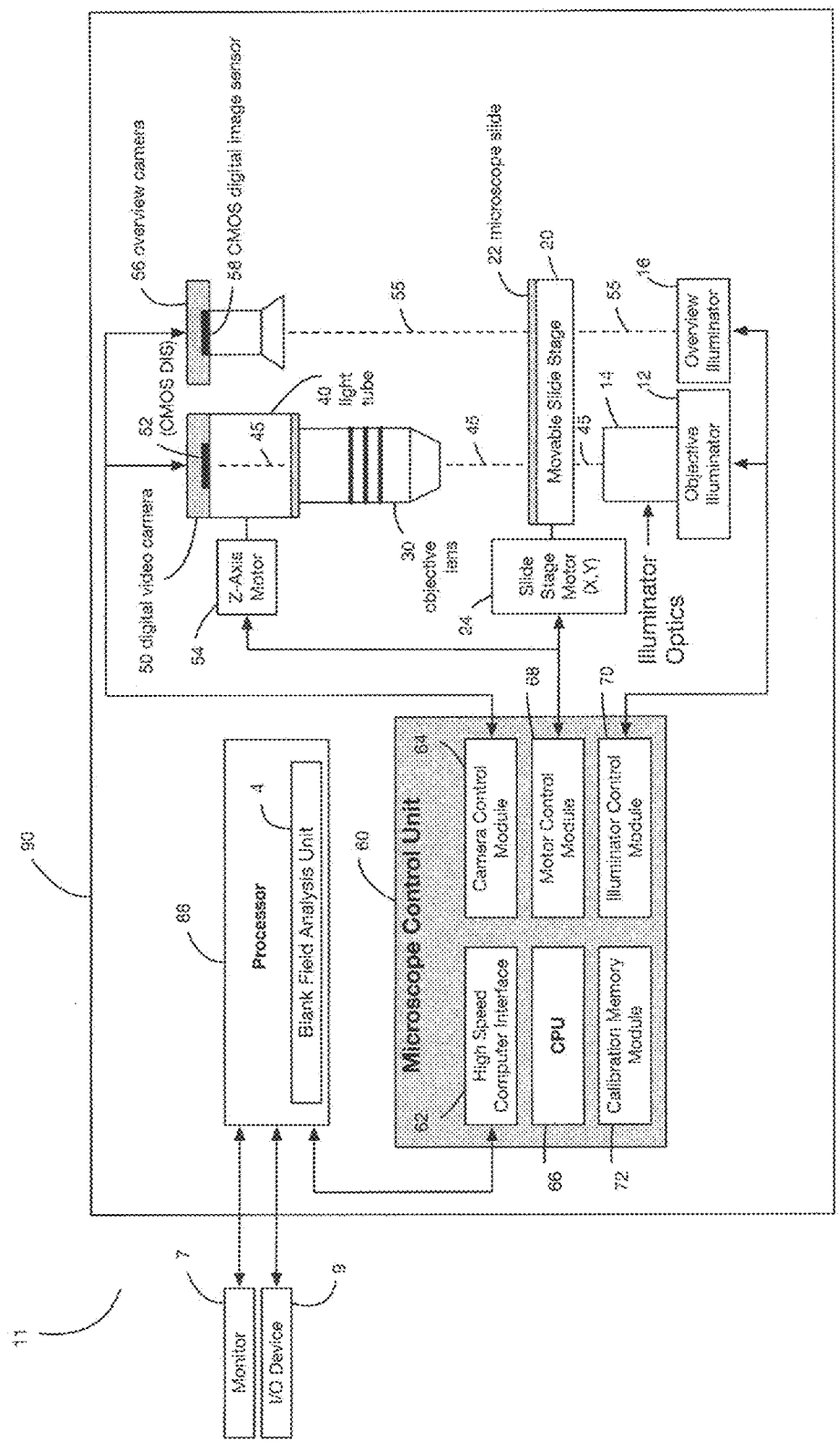
FIG. 2 is a block diagram of one embodiment of a slide scanning microscope system according to the present invention.

In some embodiments, image analysis software (e.g., in SSM control unit 8 of computer system 5, or microscope control unit 60 of SSM 10 of FIG. 1, or processor 88 of FIG. 2) may be used to determine a focus value for each image of the Z-stack. In one embodiment, an image of the Z-stack having the most appropriate focus value is retained as the field image associated with the particular (X-axis, Y-axis) slide stage location. In another embodiment, the image analysis software may determine focus values for one or more portions or sub-elements of the images of the Z-stack, and may assemble a field image for the particular location by selecting various portions from different images of the Z-stack based on the respective focus values of each portion, such that the field image for use in assembling a combined ROI image is a composite field image comprising image portions from a plurality of images of the Z-stack.

Hardware components of the slide scanning microscope 10 are electrically controlled by a microscope control unit 60. The microscope control unit may comprise hardware, software and/or firmware in a variety of configurations to accomplish the microscope tasks and operations discussed herein. While a variety of different hardware, software and firmware configurations may be used to achieve the control functions noted below, such configurations are deemed to be within the scope of the invention except as specifically excluded by the claims.

In the embodiment shown in FIG. 1, SSM 10 includes a case 90 within which substantially all of the foregoing except computer system 5 are housed. Thus, case 90 provides a protective enclosure for the moveable slide stage 20, motors 24 and 54, overview camera 56 and digital video camera 50, objective lens 30, illuminators 12 and 16, illuminator optics 14, and microscope control unit 60.

SSM 10 is capable of coupling, via a high-speed computer interface 62 (e.g., USB 2.0 or higher, ethernet, or Thunderbolt), to a computer system 5 which may comprise any of a variety of commercially available computer systems. In the embodiment of FIG. 1, computer system 5 is external to the SSM 10 as housed within case 90.

A user of the SSM 10 may provide commands from a computer system 5 to the microscope control unit 60 of the SSM via a high-speed computer interface 62. Computer system 5 includes a SSM control unit 8 in a computer 6, and a monitor or display 7. In one embodiment, SSM control unit 8 includes a graphical user interface (GUI) which may be displayed on the monitor 7. The SSM control unit 8 of computer system 5 comprises one or more of hardware, firmware and software to enable the user to exchange commands and data with the SSM 10.

Microscope control unit 60 includes one or more modules to control the operations of the SSM 20. In one embodiment, the high-speed computer interface 62 of microscope control unit 60 comprises a microcontroller with integrated USB functionality. In a specific embodiment, the microcontroller with integrated USB functionality includes a high-performance GPIB (General Purpose Interface Bus) that may be used to directly drive the USB bus from the video data stream of the digital video camera 50. In some embodiments, commands may be either handled directly by the high-speed computer interface 62 or routed to a Central Processing Unit (CPU) 66 for handling.

In one embodiment, a Central Processing Unit (CPU) 66 is included in the microscope control unit 60, and commands from the SSM control unit 8 of computer system 5 that are received by the high-speed computer interface 62 are forwarded to the (CPU) 66 within MCU 60. CPU 66 may process the commands to one or more of a camera control module (CCM) 64, a motor control module (MCM) 68, or an illuminator control module (ICM) 70. CPU 66 comprises, in a particular embodiment, a high-performance microcontroller capable of responding quickly (e.g., within 10-25 nanoseconds) to commands and data received from the SSM control unit 8 of computer system 5, or other modules or components of the slide scanning microscope 10. The CPU 66 is adapted to rapidly switch control lines for, e.g., motors, illuminators, and camera control. In alternative embodiments, the functions of CPU 66 may be provided by microprocessors, circuitry, software and/or firmware elsewhere in the microscope control unit 60 including, e.g., camera control module 64, motor control module 68, or illuminator control module (ICM) 70.

In the embodiment illustrated in FIG. 1, a calibration memory module (CMM) 72 is used to store various calibration data and parameters for the SSM 10. In some embodiments, the CMM 72 may be omitted from the MCU 60. In one alternative embodiment, a CMM may be provided as part of SSM control unit 8 of computer system 5. In another alternative embodiment, calibration data in a CMM may be provided as part of a processor or SBC 88 (FIG. 2) that is capable of receiving user commands from an input/output device 9 and controlling a monitor or display screen 7.

Referring again to FIG. 1, although not specifically illustrated in MCU 60 or its modules 62-72, numerous additional structures may be provided therein, such as memory modules, clocks, relays, switches, etc., to accomplish the foregoing tasks as discussed for each of the MCU 60, high speed computer interface 62, CCM 64, CPU 66, MCM 68, ICM 70 and CMM 72.

As shown in FIG. 1, an illuminator control module (ICM) 70 controls the operation of illuminator 12 and illuminator optics 14. Commands for adjusting the illuminator level from 0-100% of brightness may be sent by the user from the SSM control unit 8 of computer system 5 via the high-speed computer interface 62. In one embodiment, the illuminator commands may be routed to the CPU 66, which in turn commands the ICM 70 to set the illumination level according to the command from the SSM control unit 8. In alternative embodiments, illumination commands may be routed directly from SSM control unit 8 of computer system 5 via the high-speed computer interface 62 to the ICM 70 and handled by a processor in the ICM, which directly regulates the illumination level. In one embodiment, an acknowledgement (ACK) signal may be returned to the computer system 5 via the high-speed computer interface 62 to indicate completion of the command, which may be displayed to the user on the monitor or display 7 or used by SSM control system 8.

A motor control module (MCM) 68 is used to control the operation of the motor(s) for moving the movable slide stage 20 (X-axis, Y-axis), and/or the combined structure of the objective lens 30, light tube 40, digital video camera 50, and CMOS DIS 52 (Z-axis movement). Commands from the SSM control unit 8 of computer system 5 may be sent by the user to control the one or more motors for moving the movable slide stage 20 (X and Y-axis movement), and to control the motor for moving the combined assembly (lens/tube/camera/CMOS) in Z-axis movements. In one embodiment, the motor commands may be routed to the CPU 66, which in turn commands the MCM 68 slide stage (X-Y) or objective (Z-axis) motors to move. In alternative embodiments, motor commands may be routed directly from the SSM control unit 8 of computer system 5 to the MCM 68 and handled by a processor in the MCM, which directly regulates the activity of the motors as instructed by the command. In one embodiment, an acknowledgement (ACK) signal may be returned to the computer system 5 via the high-speed computer interface 62 to indicate completion of the command, which may be displayed to the user on the monitor or display 7 or used by the SSM control system 8.

A camera control module (CCM) 64 is used to control the operation of the digital video camera 50 in acquiring field images for combining into a target/ROI image. Commands from the SSM control unit 8 of computer system 5 may be sent by the user to cause the digital video camera 50 to acquire one or more field images, and the timing thereof. In one embodiment, the camera commands may be routed to the CPU 66, which in turn commands the digital video camera (DVC) 50 to acquire the image or images. In alternative embodiments, camera commands may be routed directly from the SSM control unit 8 of computer system 5 to the CCM 64 and handled by a processor in the CCM, which directly regulates the activity of the DVC 50 according to the command instruction. In one embodiment, the image data for the DVC 50 is processed by the camera control module, which controls the flow of image data to the high-speed computer interface 62. In one embodiment, this may include hardware to enable the image data to be processed at the high data rates output by the digital video camera 50. In a particular embodiment, the hardware may include a gate, controlled by the CPU 66, which interrupts the flow of image data during the move time and the settle time, previously discussed. In one embodiment, an acknowledgement (ACK) signal may be returned to the computer system 5 via the high-speed computer interface 62 to indicate completion of the command, which may be displayed to the user on the monitor or display 7 or used by the SSM control system 8.

In some embodiments, the SSM control unit 8 of computer system 5 may be enabled to send combination commands (e.g., move the slide stage 20 to a new position and acquire a field image using the digital video camera 50 after the move; move to a new X, Y position and capture a Z-stack of images from a first Z-axis position to a second Z-axis position). Many such combined commands may be used to avoid repeated or routine tasks that may execute slowly due to interface bus latencies.

FIG. 2 is a block diagram of a slide scanning microscope (SSM) 11 according to another embodiment of the present invention. SSM 11 of FIG. 2 is similar to SSM 10 of FIG. 1, except that it may be coupled directly to a monitor 7 without an external computer 6, using only a user input/output device 9 to control the operation of the SSM Using like numbers for similar structures in SSM 10 of FIG. 1, SSM 11 of FIG. 2 includes a moveable slide stage 20, motors 24 and 54, an overview camera 56 and a digital video camera 50, an objective lens 30, illuminators 12 and 16 and illuminator optics 14, and a microscope control unit 60 having a computer interface 62, a CPU 66, a camera control module 64, a motor control module 68, an illuminator control module 70, and a calibration memory module 72. These components of SSM 11 function similarly to the identically-numbered elements of SSM 10 of FIG. 1, and the discussion of each component is omitted for brevity. SSM 11 likewise includes a case 90 housing these components.

SSM 11 includes a processor 88 within case 90 that allows SSM 11 to be coupled directly to a monitor or display 7 (e.g., via an HDMI connector coupled to processor 88) without an external computer. In one embodiment, processor 88 may comprise an operating system that allows the processor to function as a "computer system on a chip," or a single-board computer (SBC) for controlling the SSM 11. To this end, processor 88 comprises a SSM control unit (not shown), similar to SSM control unit 8 of external computer 6 of FIG. 1, that may receive inputs from the user I/O device 9 to control the function of the SSM 11. The SSM control unit of processor 88 may include a GUI for display on monitor 7, and includes firmware or software to enable a user to operate the SSM 11 with input/output (I/O) device 9. User I/O device 9 may comprise, as nonlimiting examples in various embodiments, a keyboard, a mouse, or a touchscreen (which may be a touchscreen on monitor 7). In some embodiments (not shown), user I/O device 9 may be provided on an exterior surface of case 90, e.g., as a touchscreen, touchpad, or buttons. Processor 88 further comprises a blank field analysis unit (not shown), similar to blank field analysis unit 4 of FIG. 1, for identifying blank fields during the acquisition of field images. Operation of the blank field analysis unit is discussed more fully in connection with FIGS. 3-10.

A user of the SSM 11 may provide signals to processor 88 using I/O device 9 to generate one or more commands that are passed to the microscope control unit 60 of the SSM via a high-speed computer interface 62, e.g., to move the slide stage 20 to a new position and acquire a field image using the digital video camera 50 after the move. In the embodiment of FIG. 2, microscope control unit 60 of SSM 11 includes the same units/modules as described for SSM 10 of FIG. 1. In some embodiments (not shown), some or all of the components and functions of microscope control unit 60 of FIG. 2 may be incorporated into processor 88.

As previously noted, a high-definition target area/ROI image may be created by combining hundreds or even thousands of individual field images, depending upon the size of the target area/ROI. Because of the various time delays associated with capturing each field image in the ROI (i.e., slide stage movement, stage settling, frame completion and (for exhaustive focus fields) refocusing), compiling a large ROI image may exceed 30 minutes in some instances. While there are many reasons for the lengthy time required to obtain all of the field images for a target area/ROI, the time required to obtain images of blank fields—particularly for exhaustive focus fields (EFFs) in which multiple images at different focuses are acquired at a single field position—represent time that is completely wasted.

As used herein, blank fields are images of a portion of the microscope slide specimen area that do not contain any portion of the slide specimen. Thus, blank fields are simply areas (and/or images thereof) that are empty or void of specimen content. Blank fields may, however, include dust, dirt, debris or scratches on the slide, the cover slip, or within a mounting medium used to secure the specimen and cover slip to the microscope slide. The presence of such non-specimen matter makes the detection of blank areas difficult, since peripheral areas of the actual slide specimen may resemble dust, dirt, debris or scratches. One objective of the present invention is to provide a method for rapidly distinguishing between blank areas and non-blank areas with only small or trace amounts of specimen.

In one aspect, embodiments of the prevent invention include systems and methods for rapidly identifying blank fields during a scan of a target area of a microscope slide, and moving the slide stage to a new field position. This significantly reduces the time wasted on acquiring images of blank fields. In particular, embodiments of the present invention allow blank fields to be identified during the settle time (ST) of slide stage movements, before the vibrations associated with the slide stage movement have completely damped out. Thus, the present invention enables blank fields to be identified—and a slide stage movement to a new field position initiated—even before a usable image for ROI purposes may be captured. Stated differently, the present invention provides methods of identifying blank fields even while the slide stage 20, objective lens 30, and/or DVC 50 are still moving and the quality of a field image is too blurry to be used as a field image in a target area image scan.

As noted, blank fields are a significant source of image scan delay in compiling target area/ROI images in "exhaustive focus" mode. Exhaustive focus fields (EFFs) are microscope slide locations at which the SSM captures a number of images at a single location, but with different focuses (i.e., the objective lens is repositioned at slightly different (Z-axis) distances from the microscope slide specimen for each image). The differently-focused group of images at a single slide stage location is known as a Z-stack, and the field at which the Z-stack is obtained is an Exhaustive Focus Field (EFF). EFFs are usually evaluated by a focusing algorithm to determine which of the plurality of images has the best focus. The best image of the Z-stack is usually retained for that field position to be included in the ROI image that may involve hundreds or thousands of other field images, some or all of which may be EFFs.

Blank fields that are treated as EFFs may cause extensive delays because the SSM, in an attempt to obtain an image with a better focus value or score, may take far more images than would be taken for a non-blank EFF. In non-blank EFFs, focus values may rapidly be computed for each image in the Z-stack. As the objective lens is moved from a low-focus position, through the optimum-focus position, and back again to a low-focus position, algorithms may be implemented to stop the camera from taking further images. Once a local maximum of the focus value is identified and focus values begin to decrease, the SSM software may stop the camera from obtaining any further images in the Z-stack, the field image from the Z-stack having the best focus value may be retained as the field image for the stationary field position, and the slide stage may then be moved to the next field image (X, Y position) location to acquire the next image for the target area. In contrast to non-blank fields, the focus scores for blank fields have little or no variation at different objective lens positions within the Z-stack. Because there is no well-defined local maximum of focus values, typical focusing algorithms may not stop the image acquisition process until either a predetermined number of images are obtained or until the objective lens becomes too close to the slide specimen itself and further images could damage the slide In one aspect, embodiments of the present disclosure include systems and methods for identifying blank fields while capturing a plurality of color field images of a target area/ROI of a microscope slide specimen using a fixed image acquisition (FIA) slide scanning microscope (SSM) having a movable slide stage, an objective lens, and a digital video camera having a digital image sensor (DIS) for capturing images from a series of stationary field positions collectively covering the target area/ROI. In some embodiments, the invention includes systems and methods for improved scanning of a target area by rapid identification of blank field images based the pixel intensity distribution of a field image. In some embodiments, a pixel intensity (or brightness) distribution analysis may be performed using the RGB color data for the pixels in the field image. In one embodiment, a pixel intensity distribution analysis is performed as a grayscale pixel value distribution analysis of the RGB color data for the pixels in the field image.

Figure 4:
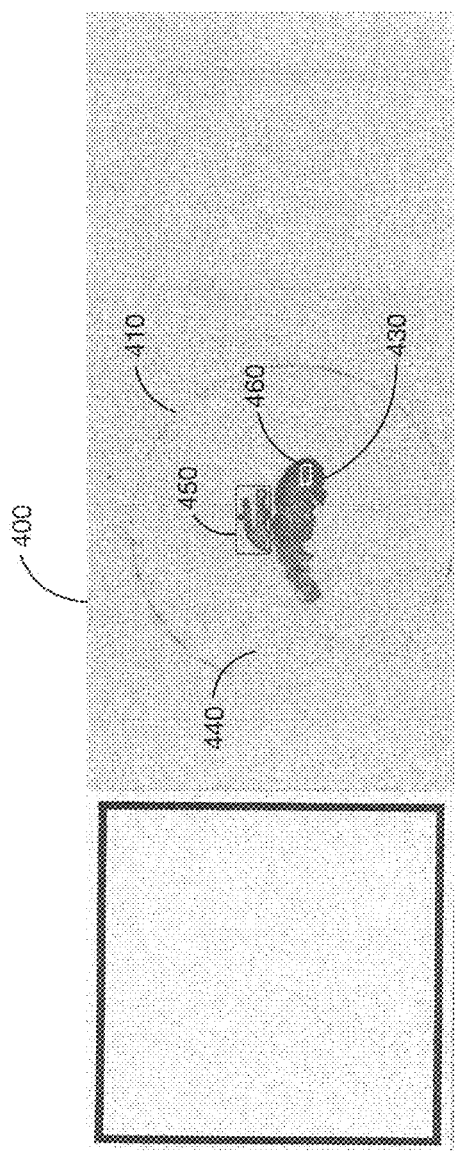
FIG. 4 is an illustration of a microscope slide, including a specimen and cover slip, suitable for examination using a slide scanning microscope according to the present invention.

FIG. 4 illustrates a microscope slide 400 suitable for use in a slide scanning microscope (SSM). The slide 400 includes a specimen 430 mounted on the slide and protected by a cover slip 410. Although not forming part of the specimen, the area covered by the cover slip includes debris 440 thereon, which may include fibers, dirt, scratches, smudges, air bubbles, etc. that may affect the scanning operations of the SSM. A first target area 450 and a second target area 460, each of which may be designated by a user (as indicated by the boxes outlining the first and second target areas) are also shown. A target area (e.g., first target area 450) may be used to indicate a portion of the specimen that the user desires to scan and view as a single image at high magnification. Target areas such as first and second target areas 450 and 160 may be individually selected by the user with a computer (e.g., using a mouse, touchpad, touchscreen or other highlighting tool) on an overview image of the specimen. It will be appreciated that, although multiple target areas on a slide may be designated, each target area is individually scanned and combined into separate target area images (i.e., target areas 450 and 460 will be prepared separate images by the SSM and viewed separately by the user).

As can be seen in FIG. 4, a significant portion of the first target area 450 is blank—i.e., does not include specimen content. Because the entirety of the first target area 450 designated (i.e., included within the highlighted box) must be scanned, the blank portion of the first target area—which may include hundreds of smaller fields or tiles that are combined into a single image of the first target area for viewing by the user—represents wasted scan time that can significantly increase the time the user must wait to view the target area image. Embodiments of the present invention provide methods and devices to reduce scan times for target areas having blank fields.

Not all target areas include blank fields. For example, second target area 460 is located entirely within the specimen itself, and not on its periphery. Thus, unless there is a void area within the second target area 460, it will include no blank fields. However, because examination of peripheral areas (and areas including void spaces) are routine in SSM scans, there is a significant need for improved ways identifying and excluding blank fields.

Figure 5:
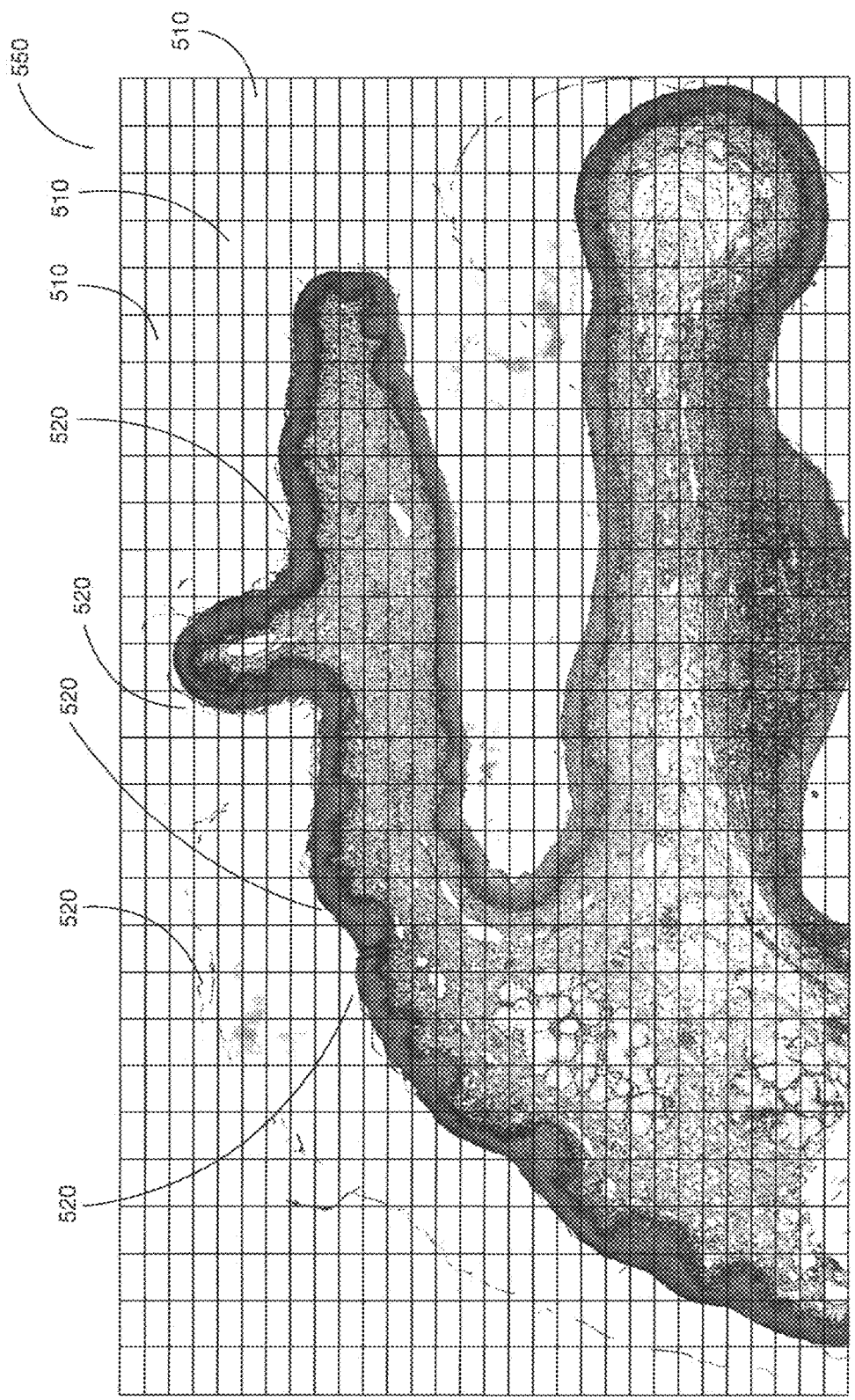
FIG. 5 is an enlarged view of a target area of the microscope slide specimen of FIG. 3, illustrating blank and non-blank fields.

FIG. 5 is a diagram of a target area/ROI image 550 of the first target area 450 of FIG. 4, illustrating how the target area image 550 is prepared from numerous smaller field images.

The individual field images are indicated by the smaller boxes that collectively form the target area image 550. By combining the individual field images into a single image, the user can view the entire target area image 550 on a monitor or display screen. The image may be magnified or reduced in size (e.g., using digital "zoom in" and "zoom out" tools) or scrolled through, just as digital photographs may be manipulated. Although shown here with boxes to designate each individual field image, it should be appreciated that in some embodiments, the boxes are eliminated and the target area ROI image is provided to the user as a single, integrated and seamless image.

The target area image 550 includes both blank field fields 510 and non-blank fields 520. It should be noted that non-blank fields 520 can include fields with no blank space (i.e., boxes completely covering specimen area) as well as fields that include mostly blank space with only a small portion of specimen content. As long as the field contains any portion of specimen, it must be included as a non-blank field. Blank fields 510 include only those fields having no specimen content, although as noted above (FIG. 4), debris may be present in blank fields 510. Thus, in many instances, distinguishing between non-blank fields having only a small portion of specimen content and truly blank fields, especially those containing debris, is a difficult problem.

The present disclosure provides improved methods and devices for rapidly identifying blank fields in fixed image acquisition (FIA) slide scanning microscopes. These improved methods and devices are made possible because applicants have discovered that blank fields have a narrow pixel color (or grayscale) distribution compared to non-blank fields. Applicants have also discovered that, for FIA slide scanning microscopes, it is possible to identify blank fields based on pixel color or grayscale distribution even while the SSM is still vibrating following a slide stage movement (i.e., before the settle time (ST) has elapsed).

Certain embodiments of the present invention involve rapidly identifying blank field images based on the narrowness of a brightness histogram of the field image. Applicants have discovered that differences in the brightness histograms of blank and non-blank images are preserved, in FIA SSMs, even in images captured during the settle time (ST) following a movement of the slide stage to a new field position. Thus, in some embodiments of the present invention an image is captured by the SSM during the settle time (ST) following a movement to a first field position, and the pixel brightness data is used to determine whether the field is a blank field. In prior art systems, images are not captured during the ST because the vibrations associated with the movement would render the image unusable as a non-blank field image. However, because the ST image is captured in the present invention and used to identify whether the first field position is a blank or a non-blank field, it may be used to avoid needless time wasted in capturing images of blank fields captured after the ST has elapsed.

For digital color images (e.g., field images taken by a SSM) stored in a memory, each pixel of the image has a pixel value that characterizes the hue (or color) and/or brightness (lightness/darkness) of the image. In many RGB digital color images, each pixel has separate pixel values for each of the red, green, and blue components of the image, and the actual color is a vector of the three RGB pixel value components. In grayscale images, a single number is used to specify the brightness of each pixel, which may vary from completely dark or black (typically represented as 0 on a 0-255 scale of grayscale pixel values and stored as an 8-bit number) to completely light or white (255 on the same grayscale range).

Color digital images may easily be mapped into grayscale images because every pixel in a color image may be mapped into a single grayscale pixel value, using the 3 RGB pixel values for pixel, each of which may include both hue and brightness values. In some embodiments of the present invention, both hue and brightness information for the pixels of a color field image may be used in a pixel intensity distribution analysis to determine whether the field image is a blank field. However, applicants have discovered that rapid identification of blank fields for color images may be performed using only grayscale (i.e., brightness) values for each pixel. Accordingly, in some embodiments, only the brightness or grayscale data for each pixel may be used.

Figure 6:
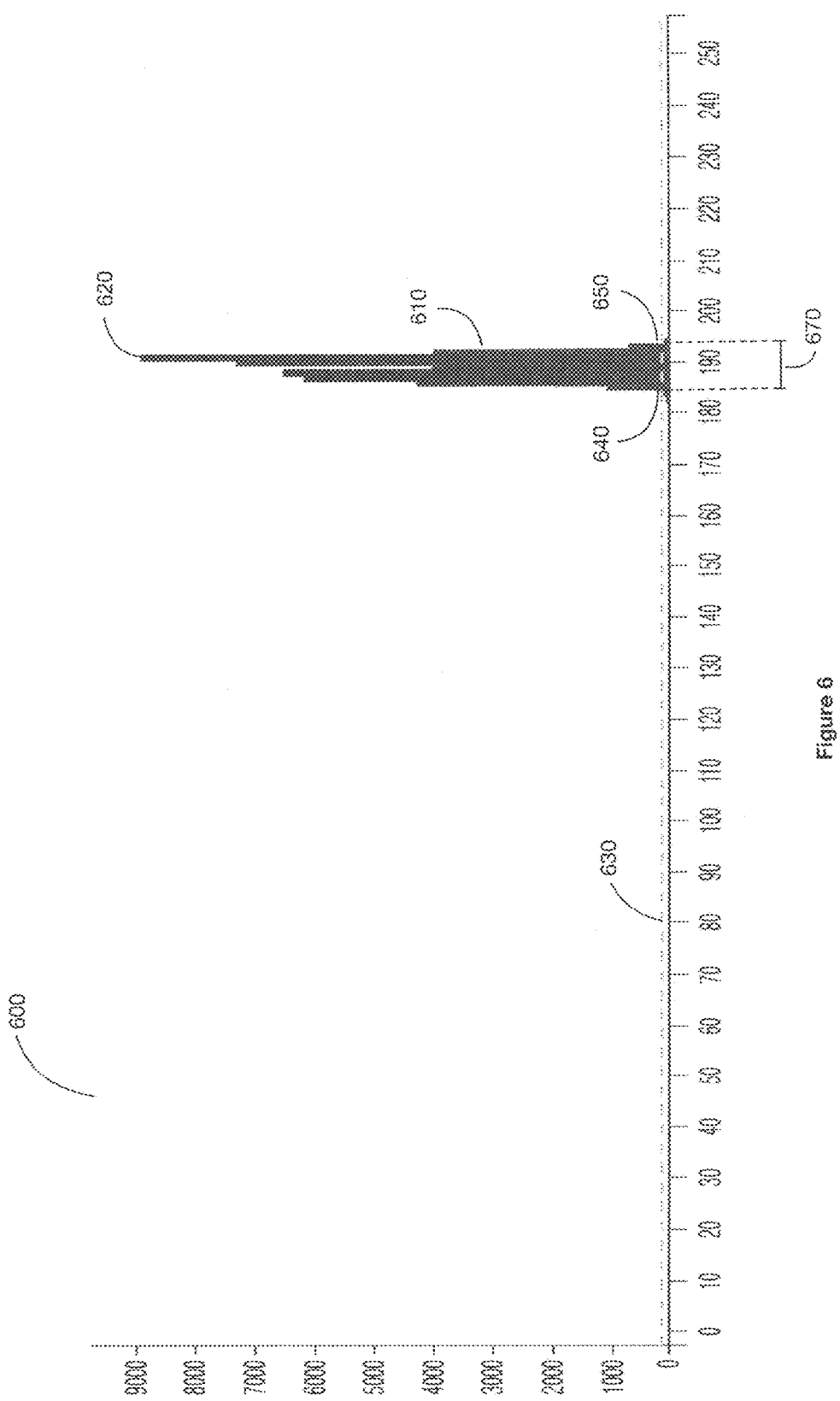
FIG. 6 is a stylized brightness histogram illustrating the pixel distribution of a blank field image of a portion of a target area of a microscope slide specimen, using a standard 0-255 grayscale pixel value line used in many computer-based image processing systems.

For ease of description, FIGS. 6 and 7 are used to describe a pixel distribution analysis for rapid identification of blank fields using a grayscale pixel value for each pixel. Although the discussion of FIGS. 6 and 7 involves grayscale pixel distribution analysis, it will be appreciated that more computationally expensive methods, using all three RGB pixel values for each pixel in a color digital image, may be used to determine whether a field image is a blank field.

In some embodiments, grayscale pixel intensity distribution analysis of the present invention involves statistical analysis of the grayscale pixel values for field images captured from a fixed image acquisition (FIA) slide scanning microscope (SSM). The grayscale pixel values are used to prepare brightness histograms for each field image, which graph the total number of pixels at each grayscale pixel value (e.g., 0-255 in the most commonly used methodology) of the image.

FIG. 6 is a stylized brightness histogram 600 illustrating the pixel distribution of a blank field image of a portion of a target area of a microscope slide specimen. In a true histogram, the Y-axis would represent the number of pixels in the field image having the brightness value of each of the X-axis values (0-255). The Y-axis of FIGS. 6 and 7 has been scaled to a value (10,000) that enables the relevant differences between blank and non-blank field images to be presented and described more easily, because the actual narrowness of blank field brightness histograms is difficult to present as standard-size drawings. While stylized, FIGS. 6 and 7 preserve the relative differences in pixel distribution between blank and non-blank images.

As shown in FIG. 6, brightness histogram 600 includes a cluster 610 of pixel data having a peak 620 located at about 190 on the 0-255 scale (i.e., the X-axis). The peak 620 corresponds to a brightness level having a high brightness value (i.e., 190), and as the narrow width of the pixel data cluster 610 suggests, there is very little pixel variation over the entire range of the 0-255 scale of the brightness histogram 600. In particular, pixel data cluster 610 spans from a minimum brightness level of about 181 to a maximum brightness level of about 194, providing a grayscale pixel range of about 15 brightness levels.

The brightness histogram 600 of FIG. 6, tightly clustered at a relatively high level of brightness, is illustrative of a histogram for a blank field. Although blank fields are usually considered as highly bright or "white," it should be noted that pixel data cluster 610 of brightness histogram 600 does exhibit some variation—i.e., it has a non-unitary grayscale pixel range, in a somewhat Gaussian distribution centered around a brightness value of about 190. This is because SSM illumination systems are typically non-uniform and exhibit variations in lighting levels over the specimen area that result in the digital image sensor (DIS) detecting different brightness levels over the sensor area.

While the pixel data cluster 610 is located toward the bright end of the 0-255 grayscale pixel value range, it is not highly clustered near the maximum brightness value (or level) of 255. To ensure that the digital image sensor (DIS) is not saturated, the brightness level of blank fields (or of light passing through an empty microscope slide) is usually set at a level substantially below the maximum brightness value (or level) of 255. While the precise level at which blank field lighting is set depends upon a number of factors (e.g., the DIS used in the SSM, the light output level and distribution uniformity of the illuminator, etc.), the general level of brightness for blank fields is set at a level substantially below the maximum brightness level or value of the sensor. This helps ensure that, in the processing of actual images, highly bright pixels are not "clipped" (and photographic data lost) because the DIS is saturated at high brightness levels.

Although the histogram 600 appears to have no other pixel values outside of the peak, it should be appreciated that the histogram will have at least some pixels for nearly all of the pixel values (0-255), because the electrical signal received from any digital camera includes noise that will be present as erroneous pixel values. Because the scale of the figure does not allow extremely small pixel counts to be perceived, this "pixel noise" does not appear to be present in histogram 600 of FIG. 6. However, methods of the present invention must take such noise into account to accurately distinguish blank fields from non-blank fields. Accordingly, a first extreme grayscale pixel value threshold 630, set at a relatively low level (approximately 100) on the Y-axis, is used to determine the extreme values (i.e., maxima and minima) of the pixel variation for the brightness histogram 600.

First threshold 630 is set at a level sufficiently low to true pixel brightness values from statistical noise. Although the first threshold 630 may vary depending upon various factors, e.g., the DIS used and the Y-axis scale used in the histogram, it should be set at a level that is above the general noise level for pixels within the image. The lower the first threshold 630 is set, the more likely it is that a random "noisy" pixel value may exceed the threshold, and that a blank field will erroneously be identified as a non-blank field. Conversely, the higher the first threshold 630 is set, the more likely it is that a true pixel brightness value will be erroneously deemed to be mere noise, and that a non-blank field will be identified as a blank field. Since the latter type of error is more detrimental, it is desirable to maintain a relatively low first threshold 630. It is possible to identify a value for the first threshold 630 that distinguishes between noise and true pixel brightness values without undue experimentation in light of the present disclosure.

Figure 3:
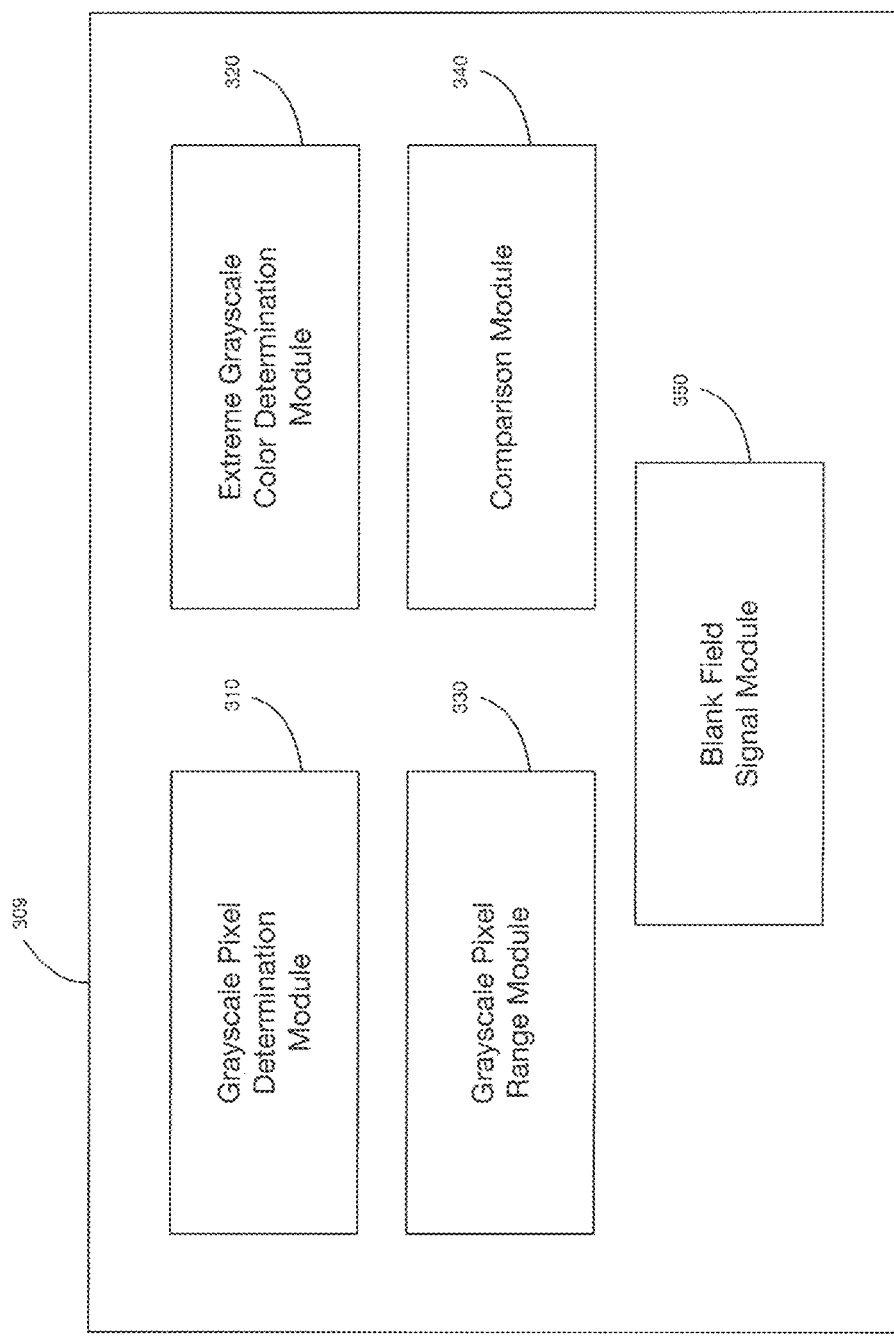
FIG. 3 is a block diagram of one embodiment of a blank field analysis unit according to the present invention.

Brightness histogram 600 also includes a first extreme grayscale pixel value 640 that is the first or lowest grayscale pixel value on the X-axis having a pixel count exceeding the first extreme grayscale pixel value threshold 630 on the Y-axis. As shown in FIG. 6, first extreme grayscale pixel value 640 occurs at a brightness (X-axis) value of about 183. A second extreme grayscale pixel value 650, defined as the last or highest grayscale pixel value on the X-axis having a pixel count exceeding the first threshold 630, which occurs at a brightness value of about 193. In the embodiment of FIG. 3, the first threshold 630 is used as both a first extreme grayscale pixel value threshold (defining the first extreme grayscale pixel value 640) and a second extreme grayscale pixel value threshold (defining the second extreme grayscale pixel value 650). In one alternative embodiment, a separate second extreme grayscale pixel value threshold (not shown)—different from first threshold 630—is used to define the second extreme grayscale pixel value threshold as the last or highest grayscale pixel value exceeding the second extreme grayscale pixel value threshold. Such an alternative embodiment may be useful for microscope specimens having a pixel value distribution weighted either toward extremely dark or extremely bright pixel distributions.

Although there are many ways to quantify the pixel value distribution of a field image, in some embodiments of the present invention, the pixel value distribution is characterized by a first grayscale pixel range distance 670, which is the distance between the first and second extreme grayscale pixel values 640 and 650. In brightness histogram 600, the first grayscale pixel range distance is about 10 (i.e., 193–193=10).

To determine whether the field image is a blank field, the first grayscale pixel range distance 670 may be compared to a non-blank grayscale pixel range threshold distance. Non-blank fields typically have a relatively wide first grayscale pixel range distance 670, in part because non-blank fields generally will have at least some true pixel values nearer to the darker end of the brightness histogram (i.e., nearer to 0 than to 255 on the 0-255 grayscale brightness range. Accordingly, a field image may be identified as a blank field if the first grayscale pixel range distance is less than the non-blank grayscale pixel range threshold distance. Because the first grayscale pixel range distance is determined based on the first threshold 630 (and in alternative embodiments a second extreme grayscale threshold), the non-blank grayscale pixel range threshold distance may differ based on the first threshold 630 (and where present, the second extreme grayscale threshold), as well as other factors (e.g., the DIS used, uniformity of the illuminator). In various embodiments of the present invention, the non-blank grayscale pixel range threshold distance may be selected from a value in the 1-120 range, such as 10, 20, 25, 50, 60, 70, 75, 80, 90, 100, etc.). In one particular embodiment, a non-blank grayscale pixel range threshold distance of 80 has provided excellent results in distinguishing blank and non-blank fields. Although appropriate values may vary among different SSMs, it is possible to identify a value for the non-blank grayscale pixel range threshold distance without undue experimentation in light of the present disclosure.

FIG. 7 is a stylized brightness histogram 700 illustrating the pixel distribution of a non-blank field image of a portion of a target area of a microscope slide specimen. FIG. 7 includes a much broader pixel distribution than that of FIG. 6, as the figure illustrates. Because a much smaller percentage of the total pixels are located near the bright end (255) of the X-axis scale, FIG. 7 has a much lower Y-axis peak value than FIG. 6, and the Y-axis of the FIG. 7 has been scaled to a lower value (5500) than FIG. 6. However, FIG. 7, while stylized like FIG. 6, illustrates relative differences in pixel distribution between blank and non-blank images relevant to embodiments of the present invention.

Brightness histogram 700 includes a first cluster 710 of pixel data having a first peak 720 located at a value of about 186 on the 0-255 X-axis scale. The first peak 720 occurs at a high brightness value, and first pixel data cluster 710 has a relatively narrow range (cluster width) from about 167 to about 192 on the 0-255 X-axis scale. First pixel data cluster 710 also exhibits a Gaussian or semi-Gaussian distribution like that of cluster 610 because of non-uniformities in the illumination systems of most SSMs, and the peak 720 is set at a level well below the maximum brightness level 255 to avoid saturation of the digital image sensor for bright areas of field images. Accordingly, first cluster 710 resembles cluster 610 of the blank field image histogram of FIG. 6, and thus suggests that the field image represented by brightness histogram 700 has some portion of blank space therein.

In contrast to FIG. 6, however, FIG. 7 also includes additional pixel count data at pixel values (from 0 to about 97 of the X-axis scale) that are absent from FIG. 6. Included in this additional pixel count data is a second pixel data cluster 720 having a second peak 740 at a pixel value (or level) of 0 on the X-axis scale. Second pixel data cluster 720 includes pixels up to a maximum value of about 97 on the 0-255 X-axis scale. A first extreme grayscale pixel value threshold 730, similar to first threshold 630 of FIG. 6, is provided at a relatively low level to distinguish possible noise from likely true pixel data, and to determine the extreme pixel values (i.e., X-axis maxima and minima relative to the first threshold 730) for the brightness histogram 700. As noted with respect to FIG. 6, first threshold 730 may vary depending upon various factors such as the digital image sensor (DIS) used in the SSM, and the Y-axis scale used in the histogram, but is set at a level above the general noise level for pixels within the image. When setting first threshold 730, lower threshold values/levels increase the risk that a random "noisy" pixel value count may exceed the threshold and that a blank field will erroneously be identified as a non-blank field, while higher threshold values increase the risk that a true pixel brightness count will be erroneously deemed to be mere noise and that a non-blank field will be identified as a blank field. Based on the disclosures provided herein, it is possible for persons of skill in the art to set first threshold 730 at a value that distinguishes between noise and true pixel brightness data without undue experimentation.

Using first extreme grayscale pixel value threshold 730 as a basis for identifying maxima and minima, brightness histogram 700 also includes a first extreme grayscale pixel value 750 having a brightness (X-axis) value of 0. Since second peak 740 of second cluster 720 also occurs at a brightness (X-axis) value of 0, the first extreme grayscale pixel value 750 occurs at the second peak 740 in the histogram of FIG. 7. It should be understood, however, that the first extreme grayscale pixel value need not coincide with a peak, and is defined simply as the lowest X-axis value having a pixel count exceeding the first threshold 730. A second extreme grayscale pixel value 760, defined as the last or highest grayscale pixel value on the X-axis having a pixel count exceeding the first threshold 730, occurs at a brightness value of about 191. While first threshold 730 is used as both the first extreme grayscale pixel value threshold and the second extreme grayscale pixel value threshold, in alternative embodiments, a separate second threshold (not shown)—different from first threshold 730—may be used to define the second extreme grayscale pixel value threshold as the last or highest grayscale pixel value on the X-axis having a pixel count exceeding the second extreme grayscale pixel value threshold on the Y-axis.

In one embodiment, the pixel value distribution may be characterized by a first grayscale pixel range distance 770, which is the distance between the first and second extreme grayscale pixel values 750 and 760. In brightness histogram 700, the first grayscale pixel range distance is about 191 (i.e., 191−0=191).

Brightness histogram 700 is illustrative of a histogram for a non-blank field. The field image may be identified as that of a blank or non-blank field by comparing the first pixel range distance 770 to a non-blank grayscale pixel range threshold distance. Non-blank fields typically have a relatively wide first grayscale pixel range distance 770. As may be seem from FIG. 7, non-blank fields such as that illustrated in brightness histogram 700 generally will have at least some true pixel values nearer to the darker end of the brightness histogram (i.e., nearer to 0 than to 255 on the 0-255 grayscale brightness range). A field image may be identified as a non-blank field if the first grayscale pixel range distance 770 is less than the non-blank grayscale pixel range threshold distance. In various embodiments of the present invention, the non-blank grayscale pixel range threshold distance may be selected from a value in the 1-120 range, such as 10, 20, 25, 50, 60, 70, 75, 80, 90, 100, etc.), in connection with a 0-255 grayscale brightness range. In one particular embodiment, a non-blank grayscale pixel range threshold distance of 80 is used. Since brightness histogram 700 has a first pixel range distance of 191, and 191 >80, the field image corresponding to brightness histogram 700 is a non-blank field image. Although appropriate values may vary among different SSMs, it is possible to identify a value for the non-blank grayscale pixel range threshold distance without undue experimentation in light of the present disclosure.

Using the pixel intensity distribution analysis of FIGS. 6 and 7, in many cases a blank field can be identified even before the vibrations following a movement to a new position have damped out. A movement of the slide stage to a new position can be immediately implemented, thereby saving not only the remaining portion of the settle time, but also, for exhaustive any additional time that might have been wasted as the focusing algorithm made a futile attempt to identify the image having attempted to identify the most focused image in the Z-stack.

Figure 9:
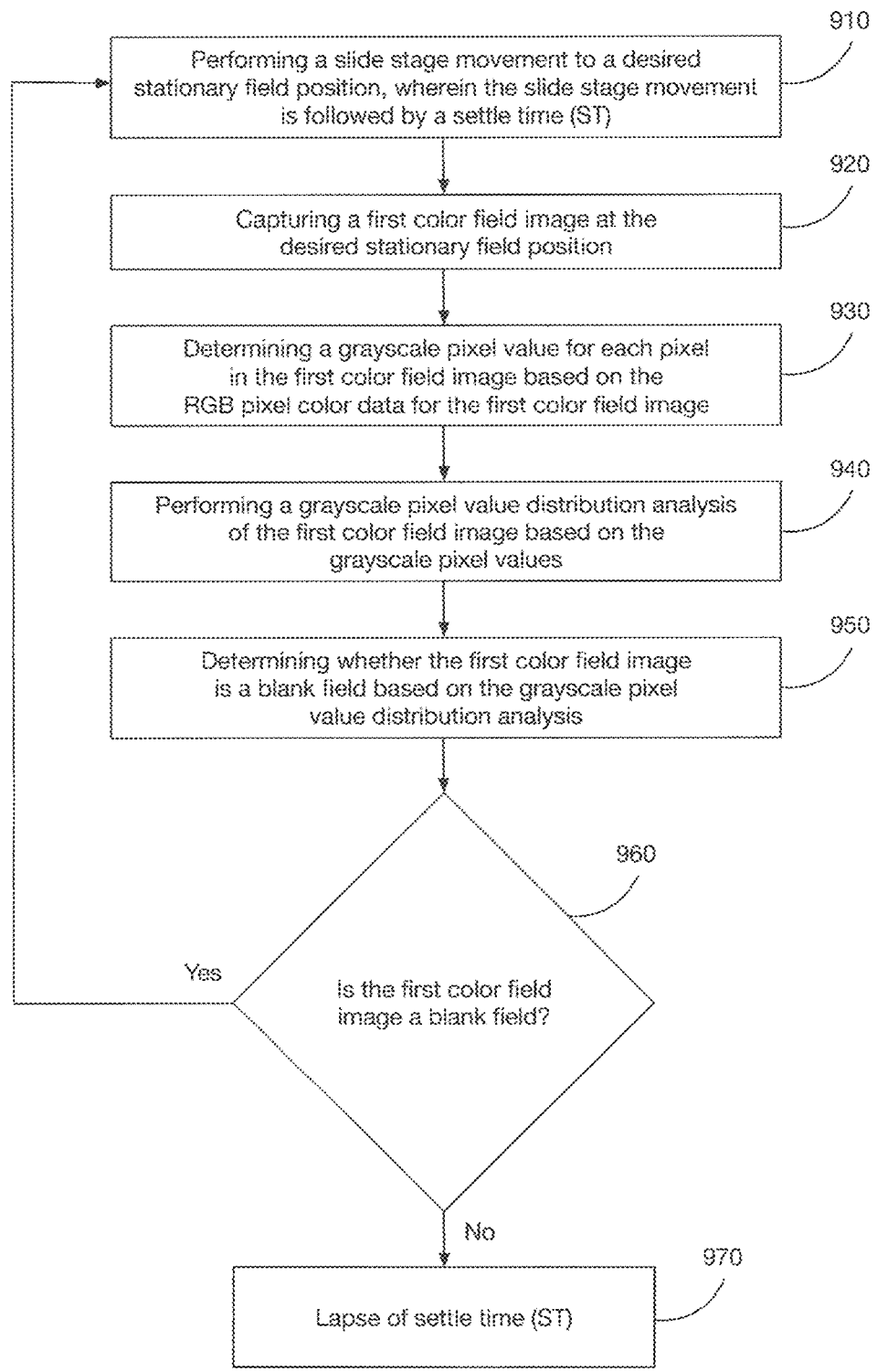
FIG. 9 is a flow chart of another method for rapidly identifying blank fields while capturing a plurality of field images of a microscope slide specimen area using a slide scanning microscope.
Figure 10:
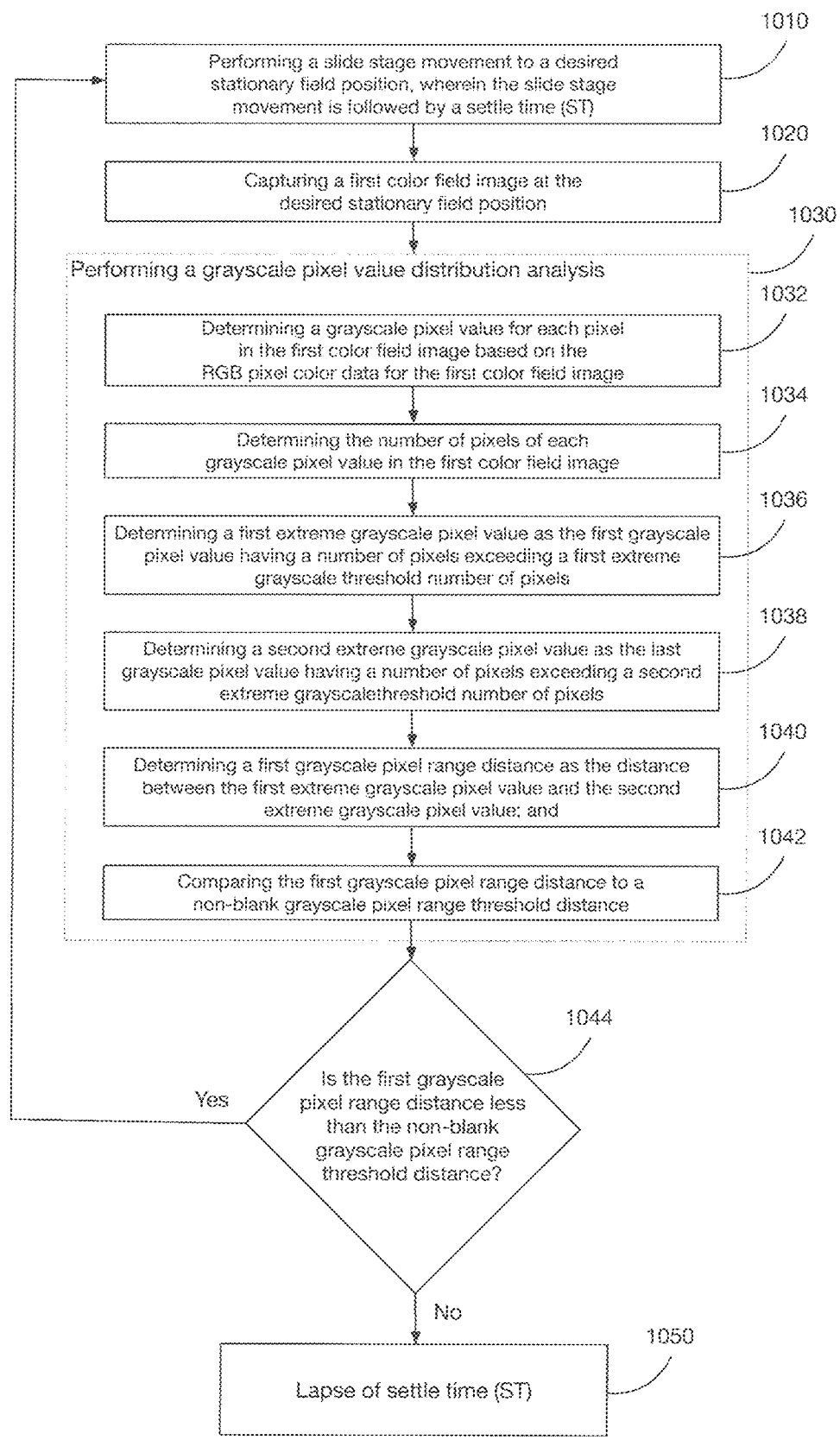
FIG. 10 is a flow chart of another method for rapidly identifying blank fields while capturing a plurality of field images of a microscope slide specimen area using a slide scanning microscope.

FIGS. 8-10 illustrate methods of identifying blank fields during the capture of color field images using a SSM, based on the pixel intensity or brightness distribution analysis described in connection with FIGS. 6 and 7. In particular, FIGS. 8-10 describe methods of identifying blank fields during the settle time (ST) following a slide stage movement to a desired stationary position, and initiating a slide stage movement to a different position prior to the lapse of the settle time, thereby avoiding wasting time capturing blank field images.

FIG. 8 is a flow chart disclosing one embodiment of a method 800 of identifying blank fields while capturing a plurality of color field images using a slide scanning microscope, such as would be automatically performed in preparing a target area/ROI image. The field images each comprise an image of a portion of the target area of the slide specimen, and the plurality of images together cover the target area/ROI. SSMs in which the present invention may be used are those having a moveable slide stage for holding a microscope slide, a movable objective lens, a digital video camera (DVC) having a color digital image sensor (DIS) that encodes RGB color data for each pixel of the field image, and a control unit for controlling the operation of the movable slide stage, movable objective lens, and the DVC in the capture of the field images.

The method 800 includes performing a slide stage movement 810 to a desired stationary field position, where the movement has a slide stage settle time (ST) following the movement, during which vibration of the SSM precludes capturing a usable image of a non-blank field. Essentially, the movement results in vibrations that require a settle time, which may range from 30-250 mSec, to dampen out such that a usable (e.g., sufficiently non-blurry) image may be captured using the DVC. Following the slide stage movement, the method further includes capturing (820) a first color field image at the desired stationary field position. After the image is captured, the method includes determining (830) a grayscale pixel value for each pixel in the first color field image based on the RGB pixel color data for the first color field image. As previously discussed, RGB pixel color data can be used to map any color to a corresponding grayscale value, and many algorithms automatically perform such functions using the pixel data of the first color field image.

Using the grayscale pixel data, the method includes determining (840) a first extreme grayscale pixel value as the first (or lowest) grayscale pixel value exceeding a first extreme grayscale threshold number of pixels. As discussed in connections with FIGS. 6 and 7, a first extreme grayscale threshold is established as a threshold to distinguish true pixel count levels of each grayscale value (e.g., 0-255) from lower levels that may be noise. Accordingly, the first extreme grayscale threshold is set at a pixel count level (e.g., hundreds or thousands of pixels, depending upon factors such as the number of pixels and sensitivity of the DIS) that exceeds those that may be associated with noise. The first extreme grayscale pixel value is the lowest or first (i.e., darkest pixel value) that exceeds the first extreme grayscale threshold.

The method also includes determining (850) a second extreme grayscale pixel value as the last (or highest) grayscale pixel value exceeding a second extreme grayscale threshold number of pixels. In one embodiment, the second extreme grayscale threshold is the same as the first extreme grayscale threshold used in step 840, while in other embodiments the second extreme grayscale threshold is different from the first extreme grayscale threshold. Like the first extreme grayscale threshold, the second extreme grayscale threshold is set at a pixel count level that exceeds levels likely to be associated with noise in the digital video camera and digital image sensor used in the SSM. Regardless of the level at which the second extreme grayscale threshold is set, the second extreme grayscale pixel value provides the last or highest (i.e., lightest pixel value) that exceeds the threshold.

A first grayscale pixel range distance is determined (860) as the distance between the first extreme grayscale pixel value and the second extreme grayscale pixel value, similar to the distances 670 and 770 of FIGS. 6 and 7, respectively. The first grayscale pixel range distance is a useful measure of pixel distribution for distinguishing blank and non-blank images in some embodiments of the present invention in view of applicants' discovery that the pixel width distribution of blank field images is much narrower than that of non-blank fields.

The method further comprises initiating (870), prior to the lapse of the settle time, a repeat of performing a slide stage movement (810) to a desired stationary field position, if the first grayscale pixel range distance is less than a non-blank grayscale pixel range threshold distance. As noted in the discussion of FIGS. 6 and 7, on a common 0-255 grayscale range, a non-blank grayscale pixel range threshold distance in the range of 1-120 may be used. In one embodiment, a non-blank grayscale pixel range threshold distance of 80 may be used.

The method further comprises, if the grayscale pixel range distance is not less than the non-blank grayscale pixel range threshold distance, allowing the settle time to lapse (880). This corresponds with a determination that the field is a non-blank field. In some embodiments (discussed more fully in connection with FIG. 11 below), the method may involve capturing a field image after the settle time has elapsed (i.e., after the vibrations associated with the movement to the desired stationary field position have damped out). Such an image may be used as a field image for combination with other field images to prepare a single target area/ROI image at high definition/magnification.

As noted, applicants have discovered that the first grayscale pixel range distance may be rapidly determined during the settle time following a move to a desired position. Without being bound by theory, it is believed that an image captured during the settle time involves a "smearing" of the pixels that, to the extent it has an effect on pixel width distribution, would tend to widen the distribution and increase the likelihood that a blank field image would be considered as a non-blank field image (since the "smeared" image would have a wider distribution than a "non-smeared" image captured after the settle time). While such a result (i.e., treating a blank field image as a non-blank image) would involve capturing one or more field images after the settle time has elapsed, thereby saving less time than correctly scoring the blank field image as a blank field, it avoids the riskier possibility of treating a non-blank (i.e., specimen-containing) field as a blank field, which would entail the loss of visual data and information about the specimen.

FIG. 9 is a flow chart disclosing one embodiment of a method of identifying blank fields (900) while capturing a plurality of color field images using a slide scanning microscope (SSM). The field images each comprise an image of a portion of a target area/ROI of the slide specimen, and the plurality of images together cover the target area/ROI. SSMs for practicing the method have a moveable slide stage, a movable objective lens, a digital video camera (DVC) having a color digital image sensor (DIS) that encodes RGB color data for each pixel of the field image, and a control unit for controlling the operation of the movable slide stage, movable objective lens, and the DVC in the capture of the field images.

The method 900 includes performing a slide stage movement 910 to a desired stationary field position, where the movement has a slide stage settle time (ST) following the movement, during which vibration of the SSM precludes capturing a usable image of a non-blank field. The vibrations are the result of the movement, and require a settle time of, e.g., 30-250 mSec, to dampen out such that a usable image may be captured using the DVC. Following the slide stage movement, the method further includes capturing (920) a first color field image at the desired field stationary position.

The method also includes determining (930) a grayscale pixel value for each pixel in the first color field image based on the RGB pixel color data for the first color field image. Using the grayscale pixel data, the method includes performing (940) a grayscale pixel value distribution analysis of the first color field image based on the grayscale pixel values.

As shown at 950, the method includes determining whether the first color field image is a blank field based on the grayscale pixel value distribution analysis. As shown at 960, if the first color field image is a blank field, the method includes initiating, prior to the lapse of the settle time, a repeat of performing a slide stage movement (910) to a desired stationary field position. As shown at 970, the method also includes, if the first color field image is not a blank field, allowing the settle time to lapse (880). In some embodiments (discussed more fully in connection with FIG. 11 below), the method may further involve, if the first color field image is not a blank field, capturing a field image after the settle time has elapsed (i.e., after the vibrations associated with the movement to the desired stationary field position have damped out). Such an "after settle time" image may be used as a field image for combination with other field images to prepare a single target area/ROI image at high definition/magnification.

FIG. 10 is a flow chart disclosing one embodiment of a method 1000 of identifying blank fields while capturing a plurality of color field images using a SSM. The field images each comprise an image of a portion of the target area/ROI of the slide specimen. and the plurality of images together cover the target area/ROI. SSMs for practicing the method have a moveable slide stage, a movable objective lens, a digital video camera (DVC) having a color digital image sensor (DIS) that encodes RGB color data for each pixel of the field image, and a control unit for controlling the operation of the movable slide stage, movable objective lens, and the DVC in the capture of the field images.

The method 1000 includes performing a slide stage movement 1010 to a desired stationary field position, where the movement has a slide stage settle time (ST) following the movement, which allows vibrations of the SSM resulting from the movement time to dampen out such that a usable image may be captured using the DVC. Following the slide stage movement, the method further includes capturing (1020) a first color field image at the desired stationary field position.

The method includes performing a grayscale pixel value distribution analysis (1030) of the first field image. The grayscale pixel value distribution analysis includes a number of operations or steps to complete the analysis, including determining (1032) a grayscale pixel value for each pixel in the first color field image based on the RGB pixel color data for the first color field image. The grayscale pixel distribution analysis also includes determining (1034) the number of pixels (i.e., the pixel count) of each grayscale pixel value in the first color field image. As previously noted, this may involve determining the number of pixels for each of the 0-255 values of a standard grayscale range. This may be done, e.g., as part of an automatically generated grayscale histogram for the first color field image using the grayscale pixel values determined at 1032. Using the pixel count for each of the grayscale pixel values, the method includes determining (1036) a first extreme grayscale pixel value as the first grayscale pixel value having a number of pixels exceeding a first extreme grayscale threshold number of pixels. In addition, the method includes determining (1038) a second extreme grayscale pixel value as the last grayscale pixel value having a number of pixels exceeding a second extreme grayscale threshold number of pixels. As previously noted, the first and second extreme grayscale threshold number of pixels may be the same or different. From the first and second extreme grayscale pixel values, the method includes determining (1040) a first grayscale pixel range distance as the distance between the first extreme grayscale pixel value and the second extreme grayscale pixel value. This may involve merely subtracting the first extreme grayscale pixel value from the second extreme grayscale pixel value. The first grayscale pixel range distance is then compared (1042) to a non-blank grayscale pixel range threshold distance. The non-blank pixel range threshold distance is a minimum pixel range associated with non-blank fields, since blank fields have narrower pixel range distributions than non-blank fields. Accordingly, the comparison is used to identify blank fields by determining (1044) if the first grayscale pixel range distance is less than the non-blank grayscale pixel range threshold distance. If so, the method further includes initiating a repeat of performing a slide stage movement (1010) to a desired stationary field position, indicated by the arrow returning to 1010. If not, the settle time is allowed to lapse (1050), as indicated by the "no" arrow from 1044.

Figure 11:
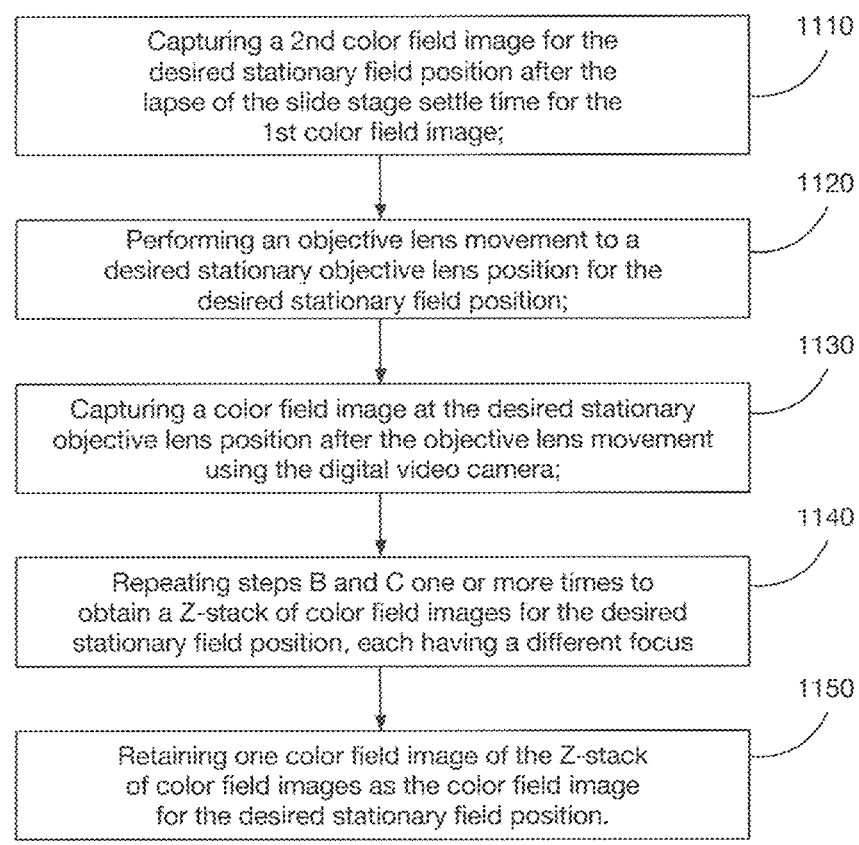
FIG. 11 is a flow chart of another method for rapidly identifying blank fields while capturing a plurality of field images of a microscope slide specimen area using a slide scanning microscope.

FIG. 11 illustrates a further embodiment of the method FIGS. 8-10 10, for cases in which the first color field image is determined to be a non-blank image (i.e., the first grayscale pixel range distance is not less (i.e., exceeds) the non-blank grayscale pixel range threshold distance). The method 1100 involves capturing multiple field images for the non-blank field to create a Z-stack of images at the same stationary field position. The method 1100 includes capturing (1100) a second color field image for the desired stationary field position after the lapse of the slide stage settle time for the first color field image. Because the second color field image is captured after the ST following the movement to the desired position has elapsed, the vibrations associated with the movement will have damped out, and the second color field image may be used as a non-blank field image as part of a combined image of a target area/ROI of the slide specimen.

The method further includes performing (1120) an objective lens movement to a desired stationary objective lens position for the desired stationary field position, and capturing (1130) a color field image at the desired stationary objective lens position after the objective lens movement using the digital video camera. Together, steps 1120 and 1130 involve the capture of a field image having a different focus than the second color field image captured at 1110.

The method also involves repeating steps 1120 and 1130 one or more times to obtain a Z-stack of color field images for the desired stationary field position, with each of the images in the Z-stack having a different focus (i.e., objective lens position). Finally, the method involves retaining one color field image of the Z-stack of color field images as the color field image for the desired stationary field position. In one embodiment, a focus value is determined for each of the images in the Z-stack and retaining an image of the Z-stack is based on the focus values of the images in the Z-stack.

In one aspect of the invention, a target area/ROI image may be assembled by repeating the method of FIGS. 10 and 11 to capture each of the plurality of field images at different stationary field positions (i.e., microscope slide locations having different X and Y slide stage positions), in which the plurality of field images that collectively cover the target area, and then assembling the plurality of color field images (e.g., by software) to form a single (i.e., one) color image of the target area.

In an alternative to the embodiment of FIG. 11, when it is determined that the field image is not a blank field image (i.e., the first grayscale pixel range distance is not less than (exceeds) the non-blank grayscale pixel range threshold distance, a Z-stack of images is not obtained and instead, after the lapse of the slide stage settle time following the capture of the first color field image, a single second field image is obtained and retained as the color field image for the desired stationary field position. One method of preparing a target area/ROI image involves repeating the method of FIG. 10 and the foregoing alternative to FIG. 11 to capture the plurality of color field images, and assembling the plurality of color field images to form the single (i.e., one) color image of the target area. Since this method involves capturing only a single image for each non-blank field position, it is sometimes referred to as an "initial focus" method of assembling a target area/ROI image.

In some embodiments of FIGS. 8-10, the field images may be classified as a blank field image if the first grayscale pixel distance is less than the non-blank grayscale pixel range threshold distance, and as a non-blank field image if the first grayscale pixel range distance is not less than the non-blank grayscale pixel range threshold distance. In a still further embodiment of FIGS. 8-10, the first color field image—despite being obtained during the settle time and unusable as a non-blank field image—may be retained as the field image for the desired stationary field position if the field image is classified as a blank field image (i.e., if the first grayscale pixel range distance is less than the non-blank grayscale pixel range threshold distance).

In one aspect, the present disclosure provides systems and apparatus for performing one or more of the methods of FIGS. 8-11. In particular, the SSM systems of FIGS. 1 and 2 include embodiments capable of performing one or more such methods. Details of various components of FIGS. 1 and 2 has already been provided above and for brevity are not repeated here. As already noted in connection with FIGS. 1 and 2, a target area/ROI image involves capturing a series of field images that together cover the target area. Images are captured by the digital video camera (DVC) 50 under the control of one or more of the CPU 66, camera control module (CCM), and motor control module (MCM) 68, which together move the moveable slide stage 20 (and the specimen thereon) to a series of positions at which the camera may capture images from the objective lens 30. Color pixel data for a captured field image may be transferred from digital video camera (DVC) 50 and/or camera control module (CCM) 64 to computer system 5 via high speed computer interface 62. Blank field analysis unit 4 may process this data according to the methods described above in connection with FIGS. 8-11. Certain embodiments of the blank field analysis unit 4 are shown in greater detail in FIG. 3.

FIG. 3 is a block diagram of a blank field analysis unit (BFAU) 309 for identifying as whether a field image is a blank or non-blank field. The blank field analysis unit 309 includes modules for analyzing a field image obtained after the slide stage has been moved to a new field position (i.e., after the completion of the move time (MT)), determining whether the field image is a blank field, and initiating a move to a new field position before the lapse of the settle time if the image is a blank field. Units or modules for detecting blanks fields as discussed in this application may comprise one or more of hardware, software and/or firmware. Although described hereinafter in connection with BFAU 4 of FIG. 1, in some embodiments the BFAU 309 may be may be incorporated as part of the processor 88 of FIG. 2.

Blank field analysis unit 309 includes a grayscale pixel determination module 310 that creates a grayscale (or brightness) pixel value for the pixels of a field image based on the RGB pixel color data. The grayscale pixel determination module 310 "maps" any RGB color into a grayscale or brightness value that in one embodiment is a number in a well-known 0-255 grayscale range widely used in image processing. The grayscale pixel determination module 310 may be part of a histogram module (not shown) that may comprise hardware software and/or firmware in some embodiments. The grayscale pixel determination module also uses the grayscale pixel values for the field image to determine the number of pixels of each grayscale value (e.g., the number of pixels in the field image for each of the 0-255 grayscale range values).

An extreme grayscale color determination module 320 determines first and extreme grayscale pixel values. As discussed in connection with FIGS. 8-11, the first extreme grayscale pixel value is the first (or lowest) grayscale pixel value exceeding a first extreme grayscale threshold number of pixels, while the second extreme grayscale pixel value is the last (or highest) grayscale pixel value exceeding a second extreme grayscale threshold number of pixels. The first and second extreme grayscale thresholds, which in various embodiments may be the same or different, are set at pixel counts that exceeds counts likely to be associated with noise for the digital video camera (DVC) and digital image sensor (DIS) used in the SSM.

A grayscale pixel range module 330 determines a first grayscale pixel range distance as the distance (on the grayscale range (e.g., 0-255) being used for analysis) between the first extreme grayscale pixel value and the second extreme grayscale pixel value, as exemplified by distances 670 and 770 in FIGS. 6 and 7. This value may be used to distinguish blank and non-blank images because values for blank fields are much smaller (i.e., the distance is much less) than those for non-blank fields having some amount of specimen content. To determine whether the field image is a blank or a non-blank field, comparison module 340 compares the first grayscale pixel range distance to a non-blank grayscale pixel range distance that is the minimum pixel range associated with non-blank fields. If the first grayscale pixel range distance is less than the non-blank grayscale pixel range threshold distance, the slide stage position and field image correspond to a blank field. In contrast, if the first grayscale pixel range distance exceeds the non-blank grayscale pixel range threshold distance, the field image is of a non-blank field.

Finally, BFAU 309 includes a blank field signal module 350 that provides a signal, if the field is a blank field (i.e., if the first grayscale pixel range distance is less than the non-blank grayscale pixel range threshold distance, to initiate a slide stage movement to a (new) desired stationary field position. This may involve causing the SSM to move the slide stage to the next field position to capture the next field image for a target area that may include hundreds or thousands of field images. Because embodiments of the present invention may terminate the capture of a blank field image to save from, e.g. 50-500 mSec for each field image, in a target area that includes 1000 blank fields, the identification of blank fields according to embodiments of the present invention may reduce the target area capture time by from 50 to 500 seconds or more.

In one aspect, the invention relates to a compact slide scanning microscope (SSM) to be coupled to a computer and a display monitor. In one embodiment, a compact SSM in this aspect of the invention comprises a polarizing light source and a polarity analyzer for analyzing the optical activity of a birefringent microscope specimen. In a particular embodiment, the compact SSM has a volume of less than 0.75 cubic feet. In another embodiment, the compact SSM has a volume of less than 0.5 cubic feet. In another embodiment, the compact SSM has a volume of less than 0.4 cubic feet. In still other embodiments, the compact SSM has a volume less than 0.3, 0.25, 0.2 and 0.15 cubic feet, respectively.

In various embodiments, the present invention relates to the subject matter of the following numbered paragraphs.

300. A slide scanning microscope system for identifying blank fields during the capture of a plurality of color field images using a slide scanning microscope, wherein each color field image is captured from one of a plurality of stationary slide stage positions using a digital video camera and comprises an image of a portion of a target area of a microscope slide specimen, the slide scanning microscope system comprising:

a) a slide scanning microscope comprising:
1) a movable slide stage for holding a microscope slide having a specimen thereon;
2) at least one slide stage motor capable of performing a slide stage movement to move the movable slide stage to a desired stationary slide stage position, the slide stage movement producing post-movement vibrations of the slide scanning microscope and having a slide stage settle time during which the vibrations preclude capturing a usable image of a non-blank field using the digital video camera;
3) at least one objective lens for magnifying light received from the specimen;
4) at least one digital video camera, wherein each of the at least one digital video cameras is optically coupled to one of the at least one objective lenses, each of the at least one digital video cameras having a digital image sensor that encodes RGB color data for the pixels in a field image; and
5) a microscope control unit comprising:
A) a computer interface for transmitting data and commands between a computer system and the slide scanning microscope; and
B) a CPU having a clock for timing a slide stage settle time following a slide stage movement to a desired stationary field position; and
b) a computer system coupled to the slide scanning microscope, capable of receiving from the digital video camera via the computer interface the RGB color data for the pixels in a first color field image captured at a first stationary field position, the computer system comprising:
1) a blank field analysis unit comprising:
A) a grayscale pixel value module for determining a grayscale pixel value for each pixel in the first color field image based on the RGB color data for the first color field image;
B) an extreme grayscale pixel value module for determining, based on the output of the grayscale pixel value module, a first extreme grayscale pixel value as the first grayscale pixel value exceeding a first extreme grayscale threshold number of pixels, and a second extreme grayscale pixel value as the last grayscale pixel value exceeding a second extreme grayscale threshold number of pixels;
C) a grayscale pixel range module for determining, based on the output of the extreme grayscale pixel value module, a first grayscale pixel range distance between the first extreme grayscale pixel value and the second extreme grayscale pixel value;
D) a comparison module for comparing the first grayscale pixel range distance to a non-blank grayscale pixel range threshold distance; and
E) a blank field signal module for initiating a slide stage movement to a second stationary field position prior to the lapse of the slide stage settle time for the slide stage movement to the first stationary field position, if the comparison module determines that the first grayscale pixel range distance is less than a non-blank grayscale pixel range threshold distance; and
2) a monitor for displaying at least a portion of said plurality of color field images.

301. The slide scanning microscope system of claim 300, the slide scanning microscope further comprising:
6) at least one objective lens motor, wherein each of the at least one objective lens motors is coupled to one of the at least one objective lenses, each of the at least one objective lens motors being capable of performing an objective lens movement to move the objective lens coupled to the motor to a desired stationary objective lens position; and
7) at least one illuminator, wherein each of the at least one illuminators is optically coupled to one of the at least one objective lenses and includes a light source to illuminate the specimen.

302. The slide scanning microscope system of claim 301, wherein the slide scanning microscope further comprises:
8) a first polarizer optically coupled to one of the at least one objective lenses, the first polarizer located between the illuminator optically coupled to said one of the at least one objective lenses and the movable slide stage;
9) an analyzer optically coupled to said one of the at least one objective lenses, the analyzer comprising a rotatable second polarizer, wherein the analyzer is located between said one of the at least one objective lenses and the digital video camera optically coupled to said one of the at least one objective lenses; and
10) an analyzer motor mechanically coupled to the rotatable second polarizer and capable of rotating the rotatable second polarizer through a rotational range of at least 90 degrees.

303. The slide scanning microscope system of claim 302, further comprising:
11) a belt mechanically coupling the analyzer motor and the rotatable second polarizer, wherein the motor and belt are capable of rotating the rotatable second polarizer through a rotational range of at least 90 degrees.

304. The slide scanning microscope system of claim 302, the slide scanning microscope further comprising
at least two illuminators;
at least two objective lenses;
at least two objective lens motors;
at least two digital video cameras, each of the at least two digital video cameras optically coupled to one of the at least two objective lenses, and
a case that houses the movable slide stage, the X-axis motor, the Y-axis motor, the at least two illuminators, the at least two objective lenses, the at least two objective lens motors, the at least two digital video cameras, the microscope control unit, the first polarizer, the analyzer, and the analyzer motor.

305. The slide scanning microscope of claim 304, wherein the case comprises a volume of 0.75 cubic feet or less.

306. The slide scanning microscope of claim 304, wherein the case comprises a volume of 0.5 cubic feet or less.

307. The slide scanning microscope of claim 304, wherein the case comprises a volume of 0.4 cubic feet or less.

308. The slide scanning microscope of claim 304, wherein the case comprises a volume of 0.3 cubic feet or less.

309. The slide scanning microscope system of claim 302, wherein the slide scanning microscope comprises:
at least two illuminators;
at least two first polarizers;
at least two objective lenses;
at least two objective lens motors, each of said at least two objective lens motors being mechanically coupled to one of the at least two objective lenses;
at least two analyzers, each of said at least two analyzers having a rotatable second polarizer;
at least two analyzer motors, each of said at least two analyzer motors being mechanically coupled to a rotatable second polarizer of one of the at least two analyzers; and at least two digital video cameras.

310. The slide scanning microscope system of claim 300, the blank field analysis unit further comprising:
F) a blank field determination module for determining that the first color field image is a blank field if the first grayscale pixel range distance is less than a non-blank grayscale pixel range threshold distance.

311. The slide scanning microscope system of claim 300, wherein said at least one slide stage motor comprises an X-axis motor capable of moving the movable slide stage in an X-axis direction, and a Y-axis motor capable of moving the movable stage in a Y-axis direction perpendicular to the X-axis direction.

312. The method of claim 311 wherein the slide stage movement comprises at least one of an X-axis movement having an X-axis settle time of from 100 mSec to 200 mSec and a Y-axis movement having a Y-axis settle time of from 30 mSec to 100 mSec, and wherein initiating a repeat of step a) comprises initiating a repeat of step a) within the X-axis settle time of an X-axis movement and initiating a repeat of step a) within the Y-axis settle time of a Y-axis movement, if the first grayscale pixel range distance is less than a non-blank grayscale pixel range threshold distance.

313. The slide scanning microscope system of claim 300, further comprising an overview camera for capturing an overview image of the specimen.

400. A slide scanning microscope system for identifying blank fields during the capture of a plurality of color field images using a slide scanning microscope, wherein each color field image is captured from one of a plurality of stationary slide stage positions using a digital video camera and comprises an image of a portion of a target area of a microscope slide specimen, the slide scanning microscope system comprising:
a) a movable slide stage for holding a microscope slide having a specimen thereon;
b) at least one slide stage motor capable of performing a slide stage movement to move the movable slide stage to a desired stationary slide stage position, the slide stage movement producing post-movement vibrations of the slide scanning microscope and having a slide stage settle time during which the vibrations preclude capturing a usable image of a non-blank field using the digital video camera;
c) at least one objective lens for magnifying light received from the specimen;
d) at least one digital video camera, wherein each of the at least one digital video cameras is optically coupled to one of the at least one objective lenses, each of the at least one digital video cameras having a digital image sensor that encodes RGB color data for the pixels in a field image;
e) a computer interface for transmitting data and commands between a first processor and the digital video camera;
f) at least one clock for timing a slide stage settle time following a slide stage movement to a desired stationary field position;
g) a first processor capable of receiving from the digital video camera via the computer interface the RGB color data for the pixels in a first color field image captured at a first stationary field position;
h) a grayscale pixel value module for determining a grayscale pixel value for each pixel in the first color field image based on the RGB color data for the first color field image;
i) an extreme grayscale pixel value module for determining, based on the output of the grayscale pixel value module, a first extreme grayscale pixel value as the first grayscale pixel value exceeding a first extreme grayscale threshold number of pixels, and a second extreme grayscale pixel value as the last grayscale pixel value exceeding a second extreme grayscale threshold number of pixels;
j) a grayscale pixel range module for determining, based on the output of the extreme grayscale pixel value module, a first grayscale pixel range distance between the first extreme grayscale pixel value and the second extreme grayscale pixel value;
k) a comparison module for comparing the first grayscale pixel range distance to a non-blank grayscale pixel range threshold distance;
l) a blank field signal module for initiating a slide stage movement to a second stationary field position prior to the lapse of the slide stage settle time for the slide stage movement to the first stationary field position, if the comparison module determines that the first grayscale pixel range distance is less than a non-blank grayscale pixel range threshold distance; and
m) a monitor for displaying at least a portion of said plurality of color field images.

401. The slide scanning microscope system of claim 400, further comprising a grayscale histogram module, wherein the grayscale histogram module prepares a grayscale histogram based on the RGB color data for the first color field image.

The particular embodiments disclosed above are illustrative only, as the invention may be modified and practiced in different but equivalent manners apparent to those skilled in the art having the benefit of the teachings herein. Embodiments of the present invention disclosed and claimed herein may be made and executed without undue experimentation with the benefit of the present disclosure. While the invention has been described in terms of particular embodiments, it will be apparent to those of skill in the art that variations may be applied to systems and apparatus described herein without departing from the concept, spirit and scope of the invention. Examples are all intended to be non-limiting. It is therefore evident that the particular embodiments disclosed above may be altered or modified and all such variations are considered within the scope and spirit of the invention, which are limited only by the scope of the claims.

The invention claimed is:
1. A method of identifying blank fields while capturing a plurality of color field images using a slide scanning microscope, each field image comprising an image of a portion of a target area of a microscope slide specimen area, the plurality of field images covering the target area, the slide scanning microscope having a moveable slide stage for holding a microscope slide, a movable objective lens, a digital video camera having a color digital image sensor that encodes RGB color data for each pixel in a field image, and a control unit for controlling the operation of the movable slide stage, the movable objective lens, and the digital video camera in capturing field images, the method comprising:
   a) performing a slide stage movement to move the slide stage to a desired stationary field position, the slide stage movement having a slide stage settle time following the slide stage movement, during which vibration of the slide stage microscope precludes capturing a usable image of a non-blank field using the digital video camera;
   b) capturing a first color field image at the desired stationary field position using the digital video camera;
   c) determining a grayscale pixel value for each pixel in the first color field image based on the RGB color data for the first color field image;
   d) determining a first extreme grayscale pixel value as the first grayscale pixel value exceeding a first extreme grayscale threshold number of pixels;
   e) determining a second extreme grayscale pixel value as the last grayscale pixel value exceeding a second extreme grayscale threshold number of pixels;
   f) determining a first grayscale pixel range distance between the first extreme grayscale pixel value and the second extreme grayscale pixel value; and g) initiating a repeat of step a) prior to the lapse of the slide stage settle time if the first grayscale pixel range distance is less than a non-blank grayscale pixel range threshold distance.

2. The method of claim 1, further comprising:
h) if the first grayscale pixel range distance is not less than the non-blank grayscale pixel range threshold distance,
1) waiting until the lapse of the slide stage settle time for the first color field image;
2) capturing a second color field image for the desired stationary field position after the lapse of the slide stage settle time for the first color field image, using the digital video camera;
3) performing an objective lens movement to a desired stationary objective lens position for the desired stationary field position;
4) capturing a color field image at the desired stationary objective lens position after the objective lens movement using the digital video camera;
5) repeating steps 3 and 4 one or more times to obtain, together with the second color field image, a Z-stack of color field images at the desired stationary field position, each color field image in the Z-stack of field images comprising an image having a different focus from the other images in the Z-stack; and
6) retaining one color field image of the Z-stack of field images as the color field image for the desired stationary field position.

3. The method of claim 2, further comprising:
i) repeating steps a) to h) to capture each of the plurality of color field images; and
j) assembling the plurality of color field images to form a single color image of the target area.

4. The method of claim 2, wherein retaining one color field image of the Z-stack of color field images comprises
determining a focus value for each color field image in the Z-stack; and
retaining one color field image of the Z-stack based on the focus value of each of the color field images in the Z-stack.

5. The method of claim 2, wherein the objective lens movement comprises an objective lens settle time, and capturing a color field image after the objective lens movement comprises capturing a color field image after the objective lens settle time has elapsed.

6. The method of claim 1, further comprising, after determining a grayscale pixel value for each pixel in the first color field image based on the RGB color data;
determining the number of pixels of each grayscale pixel value in the first color field image.

7. The method of claim 6, further comprising, after determining a grayscale pixel value for each pixel in the first color field image based on the RGB color data;
preparing a histogram of grayscale pixel values, wherein the histogram includes the number of pixels of each grayscale pixel value in the first color field image.

8. The method of claim 6, wherein determining a first extreme grayscale pixel value comprises determining the first grayscale pixel value having a number of pixels exceeding a first extreme grayscale threshold number of pixels.

9. The method of claim 1, further comprising identifying the stationary field position as a blank field if the first grayscale pixel range distance is less than the non-blank grayscale pixel range threshold distance.

10. The method of claim 1, further comprising:
h) if the first grayscale pixel range distance is not less than the non-blank grayscale pixel range threshold distance;
1) waiting until the lapse of the slide stage settle time; and
2) capturing a second color field image for the desired stationary field position after the lapse of the slide stage settle time using the digital video camera; and
3) retaining the second color field image as the color field image for the desired stationary field position.

11. The method of claim 10, further comprising:
g) repeating steps a) to h) to capture each of the plurality of color field images; and
h) assembling the plurality of color field images to form a single color image of the target area.

12. The method of claim 1 wherein the slide stage movement comprises a settle time of from 30 mSec to 300 mSec, and wherein initiating a repeat of step a) comprises initiating a repeat of step a) within a range of 30 mSec to 300 mSec of the completion of the slide stage movement if the first grayscale pixel range distance is less than a non-blank grayscale pixel range threshold distance.

13. The method of claim 1 wherein the slide stage movement comprises at least one of an X-axis movement having an X-axis settle time of from 100 mSec to 200 mSec and a Y-axis movement having a settle time of from 30 mSec to 100 mSec, and wherein initiating a repeat of step a) comprises initiating a repeat of step a) within the X-axis settle time of an X-axis movement and initiating a repeat of step a) within the Y-axis settle time of a Y-axis movement, if the first grayscale pixel range distance is less than a non-blank grayscale pixel range threshold distance.

14. The method of claim 1, further comprising the step of preparing a grayscale histogram based on the grayscale pixel values determined in step c), and wherein steps d), e), and f) are determined from the grayscale histogram.

15. A method of identifying blank fields while capturing a plurality of color field images using a slide scanning microscope, each field image comprising an image of a portion of a target area of a microscope slide specimen area, the plurality of field images covering the target area, the slide scanning microscope having a moveable slide stage for holding a microscope slide, a movable objective lens, a digital video camera having a color digital image sensor that encodes RGB color data for each pixel in a field image, and a control unit for controlling the operation of the movable slide stage, the movable objective lens, and the digital video camera in capturing field images, the method comprising:
a) performing a slide stage movement to move the slide stage to a desired stationary field position, the slide stage movement having a slide stage settle time following the slide stage movement, during which vibration of the slide stage microscope precludes capturing a usable image of a non-blank field using the digital video camera;
b) capturing a first color field image at the desired stationary field position using the digital video camera;
c) determining a grayscale pixel value for each pixel in the first color field image based on the RGB color data for the first color field image;
d) performing a grayscale pixel value distribution analysis of the first color field image, based on the grayscale pixel values determined for the pixels in the first color field image;
e) determining whether the first color field image is a blank field based on the grayscale pixel value distribution analysis; and
f) initiating a repeat of step a) prior to the lapse of the slide stage settle time, in response to a determination that the first field image is a blank field.

16. The method of claim 15, further comprising:
g) in response to a determination that the first color field image is not a blank field;
1) waiting until the lapse of the slide stage settle time for the first color field image;
2) capturing a second color field image for the desired stationary field position after the lapse of the slide stage settle time for the first color field image, using the digital video camera;
3) performing an objective lens movement to a desired stationary objective lens position for the desired stationary field position;
4) capturing a color field image at the desired stationary objective lens position after the objective lens movement using the digital video camera;
5) repeating steps 3 and 4 one or more times to obtain, together with the second color field image, a Z-stack of color field images at the desired stationary field position, each color field image in the Z-stack of color field images comprising an image having a different focus from the other images in the Z-stack; and
6) retaining one color field image of the Z-stack of color field images as the color field image for the desired stationary field position.

17. The method of claim 16, further comprising:
h) repeating steps a) to g) to capture each of the plurality of color field images; and
i) assembling the plurality of color field images to form a single color image of the target area.

18. The method of claim 15, further comprising:
g) in response to a determination that the first color field image is not a blank field;
1) waiting until the lapse of the slide stage settle time;
2) capturing a second color field image for the desired stationary field position after the lapse of the slide stage settle time using the digital video camera; and
3) retaining the second color field image as the color field image for the desired stationary field position.

19. The method of claim 18, further comprising:
h) repeating steps a) to g) to capture each of the plurality of color field images; and
i) assembling the plurality of color field images to form a single color image of the target area.

20. The method of claim 15, wherein performing a grayscale pixel value distribution analysis comprises
1) determining a first extreme grayscale pixel value as the first grayscale pixel value exceeding a first extreme grayscale threshold number of pixels;
2) determining a second extreme grayscale pixel value as the last grayscale pixel value exceeding a second extreme grayscale threshold number of pixels;
3) determining a first grayscale pixel range distance between the first extreme grayscale pixel value and the second extreme grayscale pixel value; and
4) comparing the first grayscale pixel range distance to a non-blank grayscale pixel range threshold distance.

21. The method of claim 20, wherein determining a first extreme grayscale pixel value comprises determining the first grayscale pixel value having a number of pixels exceeding a first extreme grayscale threshold number of pixels, and wherein determining a second extreme grayscale pixel value comprises determining the last grayscale pixel value having a number of pixels exceeding a second extreme grayscale threshold number of pixels.

22. A method of identifying blank field images in the capture of a plurality of color field images using a slide scanning microscope, each field image comprising an image of a portion of a target area of a microscope slide specimen area, the plurality of field images covering the target area, the slide scanning microscope having a moveable slide stage for holding a microscope slide, at least one objective lens, at least one digital video camera having a color digital image sensor that encodes RGB color data for each pixel in a field image, and a control unit for controlling the operation of the movable slide stage, the at least one objective lens, and the at least one digital video camera in capturing field images, the method comprising:
a) performing a slide stage movement to move the slide stage to a desired stationary field position, the slide stage movement having a slide stage settle time following the slide stage movement, during which vibration of the slide stage microscope precludes capturing a usable image of a non-blank field using the digital video camera;
b) capturing a first color field image at the desired stationary field position using the digital video camera;
c) performing a grayscale pixel value distribution analysis of the first field image comprising
1) determining a grayscale pixel value for each pixel in the first color field image based on the RGB color data for the first color field image;
2) determining the number of pixels of each grayscale pixel value in the first color field image;
3) determining a first extreme grayscale pixel value as the first grayscale pixel value having a number of pixels exceeding a first extreme grayscale threshold number of pixels;
4) determining a second extreme grayscale pixel value as the last grayscale pixel value having a number of pixels exceeding a second extreme grayscale threshold number of pixels;
5) determining a first grayscale pixel range distance as the distance between the first extreme grayscale pixel value and the second extreme grayscale pixel value;
6) comparing the first grayscale pixel range distance to a non-blank grayscale pixel range threshold distance; and
d) initiating a repeat of step a) prior to the lapse of the slide stage settle time if the first grayscale pixel range distance is less than the non-blank grayscale pixel range threshold distance.

23. The method of claim 22 wherein the at least one objective lens of the slide scanning microscope comprises a movable objective lens, the method further comprising:
e) in response to a determination that the first grayscale pixel range distance is not less than the non-blank grayscale pixel range threshold distance;
1) waiting until the lapse of the slide stage settle time;
2) capturing a second color field image for the desired stationary field position after the lapse of the slide stage settle time for the first color field image, using the digital video camera;
3) performing an objective lens movement to a desired stationary objective lens position for the desired stationary field position;
4) capturing a color field image at the desired stationary objective lens position after the objective lens movement using the digital video camera;
5) repeating steps 3 and 4 one or more times to obtain, together with the second color field image, a Z-stack of color field images at the desired stationary field position, each color field image in the Z-stack of field images comprising an image having a different focus from the other images in the Z-stack; and 6) retaining one color field image of the Z-stack of color field images as the color field image for the desired stationary field position.

24. The method of claim 23, further comprising:

f) repeating steps a) to e) to capture each of the plurality of color field images; and g) assembling the plurality of color field images to form a single color image of the target area.

25. The method of claim 22, further comprising:

e) in response to a determination that the first grayscale pixel range distance is not less than the non-blank grayscale pixel range threshold distance;
 1) waiting until the lapse of the slide stage settle time;
 2) capturing a second color field image for the desired stationary field position after the lapse of the slide stage settle time using the digital video camera; and
 3) retaining the second color field image as the color field image for the desired stationary field position.

26. The method of claim 22, further comprising:
determining that the first color field image is a blank field if the first grayscale pixel range distance is less than the non-blank grayscale pixel range threshold distance; and
determining that the first color field image is not a blank field if the first grayscale pixel range distance is not less than the non-blank grayscale pixel range threshold distance.

27. The method of claim 22, further comprising, after determining a grayscale pixel value for each pixel in the first color field image based on the RGB color data:
preparing a histogram of grayscale pixel values, wherein the histogram includes the number of pixels of each grayscale pixel value in the first color field image.

28. The method of claim 22, further comprising retaining the first color field image as the field image for the desired stationary field position if the first grayscale pixel range distance is less than the non-blank grayscale pixel range threshold distance.

* * * * *